(12) United States Patent
Hanaya et al.

(10) Patent No.: US 9,256,284 B2
(45) Date of Patent: Feb. 9, 2016

(54) INFORMATION PROCESSING APPARATUS AND RECORDING MEDIUM

(71) Applicant: Sony Corporation, Tokyo (JP)

(72) Inventors: Hiroyuki Hanaya, Kanagawa (JP); Kazuhiro Watanabe, Tokyo (JP); Yoichiro Sako, Tokyo (JP); Takatoshi Nakamura, Kanagawa (JP); Mitsuru Takehara, Tokyo (JP); Yuki Koga, Tokyo (JP); Kazuyuki Sakoda, Chiba (JP); Kohei Asada, Kanagawa (JP); Takayasu Kon, Tokyo (JP); Kazunori Hayashi, Tokyo (JP); Yasunori Kamada, Kanagawa (JP); Akira Tange, Tokyo (JP); Tomoya Onuma, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 14/134,542

(22) Filed: Dec. 19, 2013

(65) Prior Publication Data

US 2014/0186002 A1   Jul. 3, 2014

(30) Foreign Application Priority Data

Dec. 27, 2012   (JP) ................. 2012-285642

(51) Int. Cl.
*H04N 5/93*   (2006.01)
*G06F 3/01*   (2006.01)
*G11B 27/034*   (2006.01)
*G02B 27/01*   (2006.01)

(52) U.S. Cl.
CPC ............... *G06F 3/011* (2013.01); *G06F 3/017* (2013.01); *G11B 27/034* (2013.01); *G02B 27/017* (2013.01); *G02B 2027/014* (2013.01); *G02B 2027/0178* (2013.01)

(58) Field of Classification Search
CPC ...................................................... H04N 9/87
USPC ......... 386/278, 223, 226, 239, 241, 248, 262, 386/323, 351
See application file for complete search history.

(56) References Cited

U.S. PATENT DOCUMENTS 5,060,087 A * 10/1991 Nishijima et al. ............ 386/278
2007/0168376 A1   7/2007 Luitjens et al.
2009/0190836 A1 * 7/2009 Okamoto et al. ............. 382/190

FOREIGN PATENT DOCUMENTS

JP   2002-325241 A   11/2002
JP   2007-528056 A   10/2007

* cited by examiner

*Primary Examiner* — Robert Chevalier
(74) *Attorney, Agent, or Firm* — Hazuki International, LLC

(57) ABSTRACT

There is provided An information processing apparatus including a perspective switching control unit configured to switch a perspective when playing back content acquired by a content acquisition unit to at least one of a first-person perspective and a third-person perspective, an editing unit configured to edit a part of the content, and a playback control unit configured to play back the content edited by the editing unit in the at least one of the first-person perspective and the third-person perspective to which the perspective has been switched by the perspective switching control unit.

16 Claims, 14 Drawing Sheets

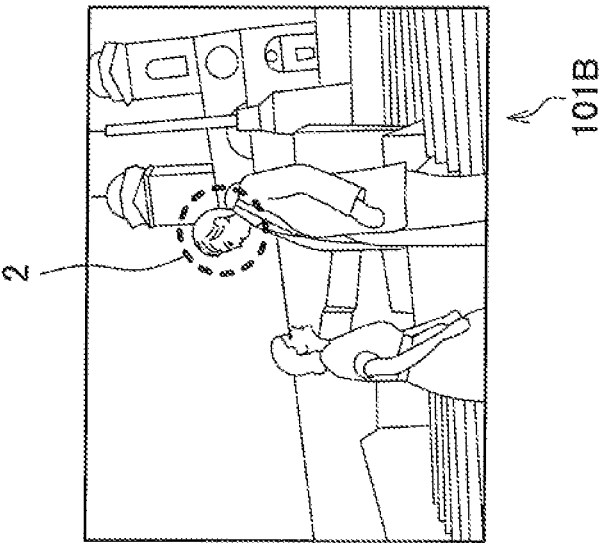
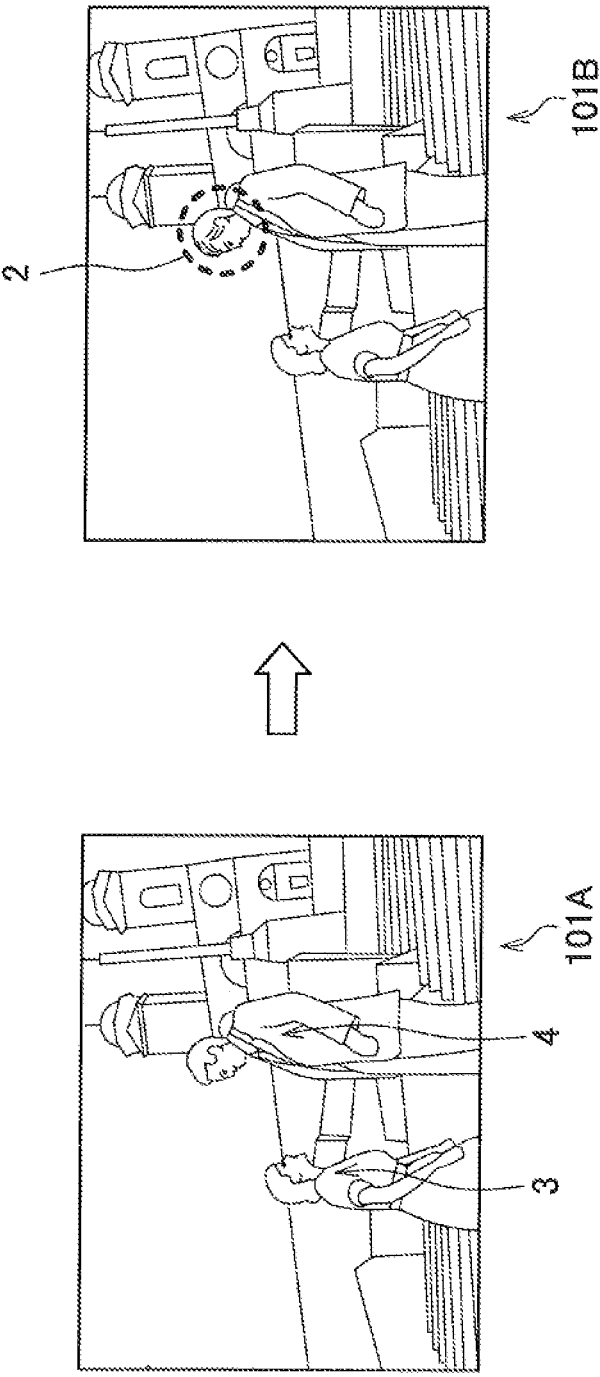

INFORMATION PROCESSING APPARATUS AND RECORDING MEDIUM

CROSS REFERENCE TO RELATED APPLICATIONS

This application claims the benefit of Japanese Priority Patent Application JP 2012-285642 filed Dec. 27, 2012, the entire contents of which are incorporated herein by reference.

BACKGROUND

The present disclosure relates to an information processing apparatus and a recording medium.

The recent dramatic developments in technologies such as the mobile terminal communication speed and storage capacity and display screen precision has enabled video content such as movies and television dramas to be easily downloaded and watched on a mobile terminal. Examples of technologies relating to the management of such video content include the following.

For example, JP 2002-325241A proposes utilizing high picture quality/high audio quality movie and television program data produced by professionals by creating a database of movies and television programs that have already been released or broadcast. More specifically, JP 2002-325241A describes a download system that allows a user to access and download a given part of audio data and moving image data in a video work, which the user can utilize as a standby screen, a ringtone or the like in a mobile terminal.

Further, JP 2007-528056T discloses a technology that automatically includes link data associated with one or more pieces of content that are associated with scene content data. It is noted that JP 2007-528056T also describes linking the scene content data (the captured images) with GPS position information (imaging location information).

SUMMARY

However, JP 2002-325241A and JP 2007-528056T only discuss the provision of data. Neither document mentions anything about switching perspective when playing back image content.

According to an embodiment of the present disclosure, there is provided a novel and improved information processing apparatus and a recording medium that are capable of switching the perspective when playing back image content to at least either a first-person perspective or a third-person perspective.

According to an embodiment of the present disclosure, there is provided an information processing apparatus including a perspective switching control unit configured to switch a perspective when playing back content acquired by a content acquisition unit to at least one of a first-person perspective and a third-person perspective, an editing unit configured to edit a part of the content, and a playback control unit configured to play back the content edited by the editing unit in the at least one of the first-person perspective and the third-person perspective to which the perspective has been switched by the perspective switching control unit.

According to an embodiment of the present disclosure, there is provided a non-transitory computer-readable recording medium having a program recorded thereon, the program causing a computer to execute switching a perspective when playing back content acquired by a content acquisition unit to at least one of a first-person perspective and a third-person perspective, editing a part of the content based on the switching of the perspective, and playing back the edited content in the at least one of the first-person perspective and the third-person perspective to which the switched perspective has been switched.

According to one or more of embodiments of the present disclosure, provided are a novel and improved information processing apparatus and a recording medium that are capable of switching the perspective when playing back image content to at least either a first-person perspective or a third-person perspective.

BRIEF DESCRIPTION OF THE DRAWINGS

FIG. 2 is a diagram illustrating editing processing of content by an information processing apparatus according to an embodiment of the present disclosure;

DETAILED DESCRIPTION OF THE EMBODIMENT(S)

Figure 1:
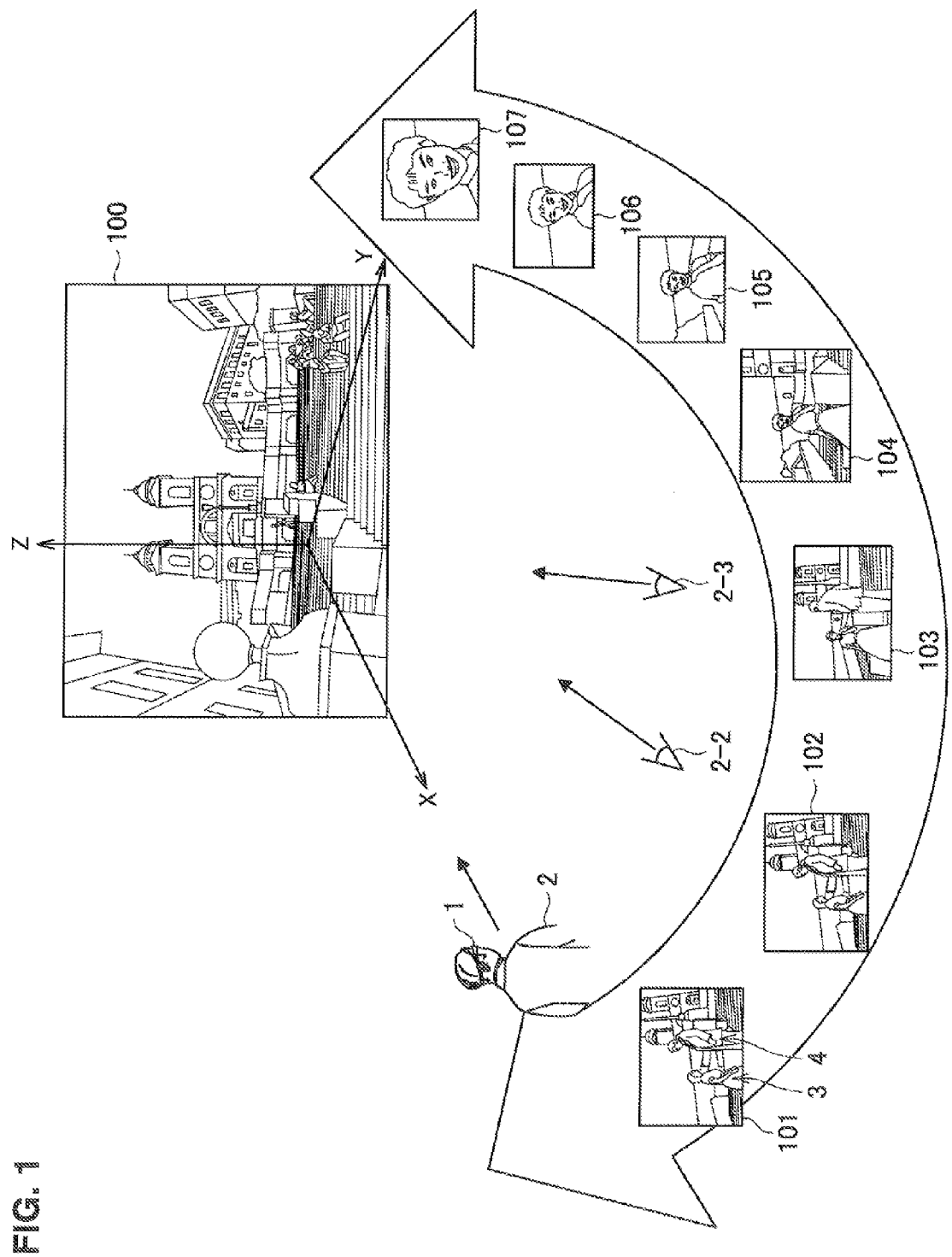
FIG. 1 is a diagram illustrating an outline of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is noted that the description will be made in the following order.

1. Outline of the information processing apparatus according to the embodiments of the present disclosure
2. Embodiments of the present disclosure
2-1. First embodiment of the present disclosure
2-1-1. HMD external configuration
2-1-2. HMD internal configuration
2-1-3. Operation processing
2-1-4. First modified example of the present disclosure
2-2. Second embodiment of the present disclosure
2-2-1. Outline
2-2-2. Operation processing
2-2-3. Second modified example of the present disclosure
3. Conclusion 1. Outline of the Information Processing Apparatus According to the Embodiments of the Present Disclosure An outline of the information processing apparatus according to the embodiments of the present disclosure will now be described with reference to FIGS. 1 and 2. FIG. 1 is a diagram illustrating an outline of an information processing apparatus according to an embodiment of the present disclosure. As illustrated in FIG. 1, the information processing apparatus according to the present embodiment is realized by an eyeglasses-type HMD (head mounted display) 1. As described in detail below, the HMD 1 is an apparatus that is worn by a user 2 for playing back content to the user 2. The HMD 1 can build a realistic virtual reality by projecting images over the entire field of view of the user 2. This content includes at least moving image-based or still image-based images (image data). For example, the content may be a movie, a television drama, animation or the like. In the present specification, the description will be based on a movie as the content.

Generally, when viewing content, the user 2 views from the perspective of the camera that captured that content (a third-person perspective). Namely, the user 2 views the content as if he/she was present at the location when the content was captured and looking at the imaging target (object) from the position of the camera lens. Examples of the imaging target include a living being, such as an actor, a dog, or a cat appearing in a movie or a television drama, a virtual living being realized by a robot or a CG (computer graphic), an animation character and the like.

Here, a case will be described in which the user 2 views content 101 captured at a scene 100 illustrated in FIG. 1. As illustrated in FIG. 1, at this stage, the user 2 views the content 101 as if looking at the imaging targets in the scene 100 (the actress 3 and actor 4 who make an appearance in content 101) from the position of the camera that captured the content 101. It is noted that when the content 101 was captured, the actress 3 and actor 4 were at the position of the origin where the X-axis, Y-axis, and Z-axis of the scene 100 illustrated in FIG. 1 intersect. Further, the camera that captured the content 101 is positioned on the X-axis illustrated in FIG. 1 during image capture.

Here, as described above, JP 2002-325241A and JP 2007-528056T only disclose an information processing apparatus that provides image content, they do not contain any description about switching perspective when playing back image content.

However, if the perspective when playing back the image content can be switched from a simple third-person perspective to a first-person perspective, which is the perspective as seen from an imaging target appearing in the image content, the entertainment value of the image content is improved.

Accordingly, the information processing apparatuses according to the respective embodiments of the present disclosure were created by focusing on the above-described situation. The information processing apparatuses according to the respective embodiments of the present disclosure can play back content by switching the perspective when playing back content to at least either the first-person perspective or the third-person perspective.

For example, as illustrated in FIG. 1, the HMD 1 can switch the perspective from the above-described third-person perspective to a first-person perspective, which is the perspective as seen from the actor 4 appearing in the content 101, and play back content 104 in the first-person perspective. The content 104 is image content in which the actress 3 appears as seen from the perspective of the actor 4. Consequently, the user 2 is immersed in the world of the content, and can enjoy the content as if he/she were actually playing the role of the actor 4 himself/herself.

Here, even within the first-person perspective, the HMD 1 can further switch perspective and play back the content. For example, as illustrated in FIG. 1, the HMD 1 can switch from the position of the actor 4 to a perspective even closer to the actress 3, and play back content 105. Consequently, the user 2 can enjoy the content as if he/she were playing the role of the actor 4 at a position nearer to the actress 3. In addition, the HMD 1 can switch to an even closer perspective, and play back content 106 and content 107.

On the other hand, even within the third-person perspective, the HMD 1 can further switch perspective and play back the content. For example, the HMD 1 can switch to a perspective 2-2, which is a position different to the camera that captured the content 101, and play back content 102. In this case, the user 2 can view the content 102 as if looking at the actress 3 and the actor 4 in the scene 100 from the position of perspective 2-2. Further, the HMD 1 can switch to perspective 2-3, and play back content 103.

Moreover, the HMD 1 according to the present embodiment can even edit a part of the content. Content editing by the HMD 1 will be described below with reference to FIG. 2.

FIG. 2 is a diagram illustrating editing processing of content by an information processing apparatus according to an embodiment of the present disclosure. As illustrated in FIG. 2, in content 101A, which is content as seen from a third-person perspective, the actress 3 and the actor 4 are facing each other. The HMD 1 according to the present embodiment can play back content 101B that has been edited as if the face portion of the actor 4 appearing in the content 101A was replaced with the face of the user 2. Consequently, the user 2 can enjoy the content as if he/she were viewing content in which the user himself/herself appeared.

Here, when switching to a first-person perspective after having seen content in a third-person perspective in which his/her own profile appears, the user 2 can experience a feeling of returning to his/her own body that until now he/she had been looking at from an external perspective. Further, when switching from a first-person perspective to a third-person perspective in which he/she sees content in which his/her own profile appears, the user 2 can see his/her own body from outside, namely, experience a feeling of having left his/her body. Combined with the ability of the HMD 1 to build a realistic virtual reality, these feelings are felt as if he/she has actually left his/her body.

Thus, the user 2 can become immersed in and enjoy the content by looking at content in which a part has been replaced with his/her own profile.

In the above, an outline of the information processing apparatus according to an embodiment of the present disclosure was described. Next, the respective embodiments of the present disclosure will be described in turn. It is noted that in the example illustrated in FIG. 1, although an eyeglasses-type HMD 1 was used as an example of the information processing apparatus, the information processing apparatus according to an embodiment of the present disclosure is not limited to this. The information processing apparatus may be some other apparatus, such as, for example, a digital camera, a digital video camera, a PDA (personal digital assistant), a notebook PC, a tablet terminal, a mobile telephone terminal, a smartphone, a portable music player, a portable image processing device, or a mobile game device.

2. Embodiments of the Present Disclosure

2-1. First Embodiment of the Present Disclosure

2-1-1. HMD External Configuration

First, the external configuration of the HMD 1 illustrated in FIG. 1 will be described with reference to FIG. 3, and then the internal configuration will be described with reference to FIGS. 4 to 6.

Figure 3:
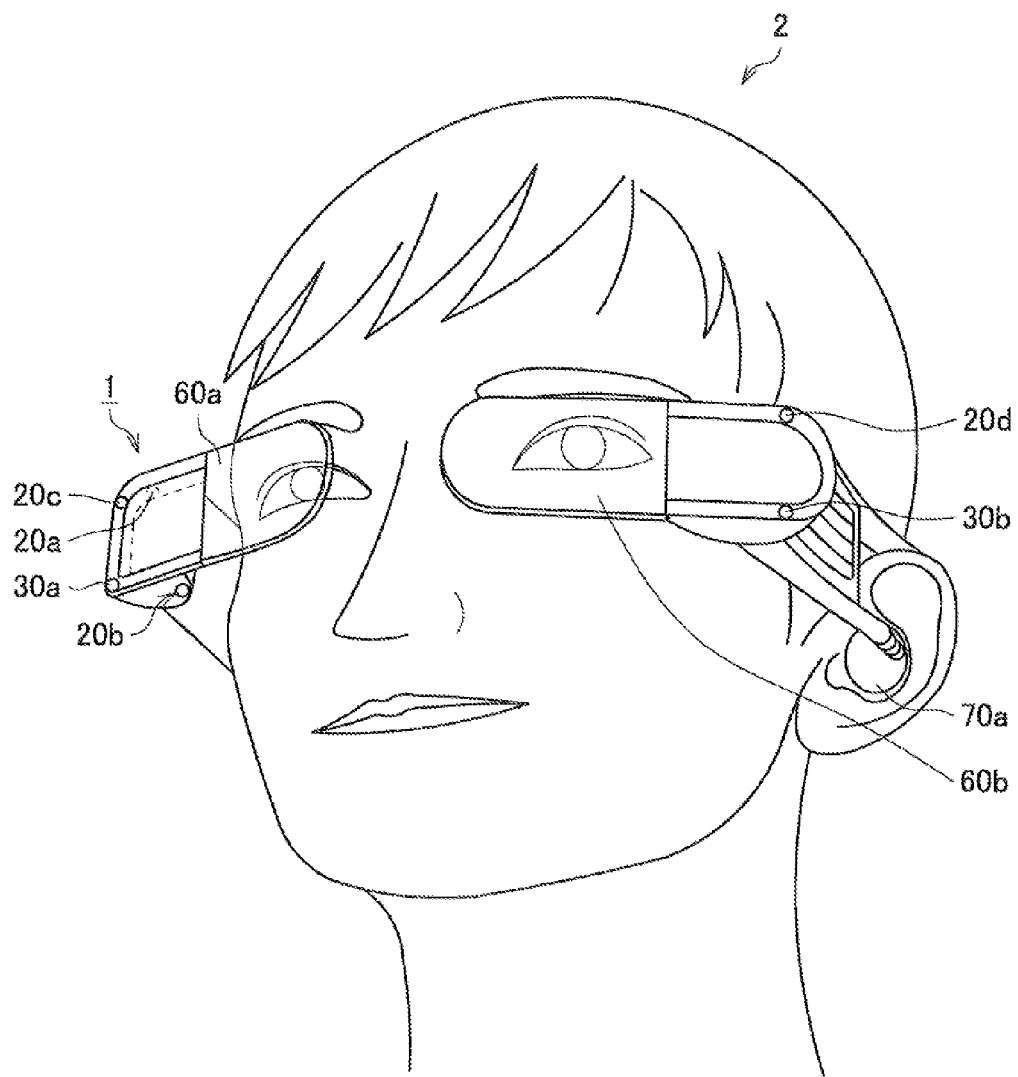
FIG. 3 is a diagram illustrating an external configuration of an HMD according to a first embodiment of the present disclosure.

FIG. 3 is a diagram illustrating an external configuration of an HMD according to the first embodiment of the present disclosure. The HMD 1 illustrated in FIG. 3 is termed an eyeglasses-type display or a see-through HMD. Specifically, the HMD 1 has a mount unit with a frame structure that extends from either side of the head half-way around to the rear of the head, and is mounted on the user 2 by placing over both ears as illustrated in FIG. 3. In a mounting state like that illustrated in FIG. 3, this HMD 1 includes a pair of display units 60a and 60b for the left and right eyes, respectively, immediately in front of either eye of the user 2, namely, at a location where the lens in ordinary eyeglasses would be. A liquid crystal panel, for example, may be used for the display unit 60 (display unit 60a and display unit 60b). The HMD 1 can be set to a see-through state like that illustrated in FIG. 3, namely, a transparent or semi-transparent state, by controlling the transmittance of the liquid crystal panel. By setting the display unit 60 to a see-through state, there are no hindrances to normal activity even if the user 2 constantly wears the HMD 1 like eyeglasses.

In addition, the display unit 60 can superimpose AR (augmented reality) information on the actual spatial landscape by displaying an image of text, a graphic or the like in the transparent or semi-transparent state.

Moreover, the display unit 60 can display a captured image of the actual space captured by imaging lenses 20a and 20b, and superimpose AR (augmented reality) information over that captured image of the actual space. Still further, the display unit 60 can play back and display content received by the HMD 1 from an external device or content stored on a storage medium (the below-described storage unit 40) of the HMD 1. Examples of the external device may include a server, a digital camera, a digital video camera, and an information processing apparatus such as a mobile telephone terminal, a smartphone, and a personal computer.

Examples of the content played back and displayed on the display unit 60 include moving image content, such as a movie or a video clip, still image content captured by a digital still camera and the like, and data in an electronic book, for example. Further, this data may be any data that can be displayed, such as computer-use data like image data, text data, and spreadsheet data created by the user 2 on a personal computer or the like, and game images derived from a game program.

In addition, although only displayed on the right side of FIG. 3, the imaging lenses 20a and 20b are arranged facing the user 2 so as to capture an image of the user 2 from close range in a state in which the user 2 is wearing the HMD 1. Here, the imaging lens 20a captures an image of the upper right portion of the user 2's face, and the imaging lens 20b captures an image of the lower right portion of the user 2's face and the upper right half of the user 2's body. Similarly, although not illustrated, an image of the upper left portion of the user 2's face as well as an image of the lower left portion of the user 2's face and the upper left half of the user 2's body are captured with imaging lenses (not illustrated) provided on the left eye side. As described below, the HMD 1 can generate a captured image that looks like it was taken from in front of the user 2 by combining these captured images of the user 2 taken from close range.

Further, imaging lenses 20c and 20d are arranged facing forward so as to capture the direction visible to the user 2 as a subject direction in a state in which the user 2 is wearing the HMD 1.

In addition, although only displayed on the left ear side in FIG. 3, a pair of earphone speakers 70a is provided that can be inserted into the left and right ear holes of the user 2 when worn.

Moreover, microphones 30a and 30b for collecting external audio are arranged to the right of the display unit 60a for the right eye and to the left of the display unit 60b for the left eye, respectively.

It is noted that the external configuration of the HMD 1 illustrated in FIG. 3 is an example. Various other configurations may be employed for mounting the HMD 1 on the user 2. It is usually sufficient for the HMD 1 to be formed from an eyeglasses-type or head-mounted type mounting unit. At the least, in the present embodiment it is sufficient for the display unit 60 to be provided close to the front of the user 2's eyes. Further, the display unit 60 may also be provided as a single unit corresponding to the eye on one side, rather than as a pair of units corresponding to each eye.

In addition, the earphone speaker 70a may be provided as a single unit for wearing on just one ear, rather than providing left and right earphone speakers. Moreover, the microphone may also be provided as just the microphone 30a or the microphone 30b.

Still further, the HMD 1 may even be configured without including the microphones 30a and 30b and the earphone speaker 70a.

In the above, the external configuration of the HMD 1 according to an embodiment of the present disclosure was described.

2-1-2. HMD Internal Configuration

Figure 4:
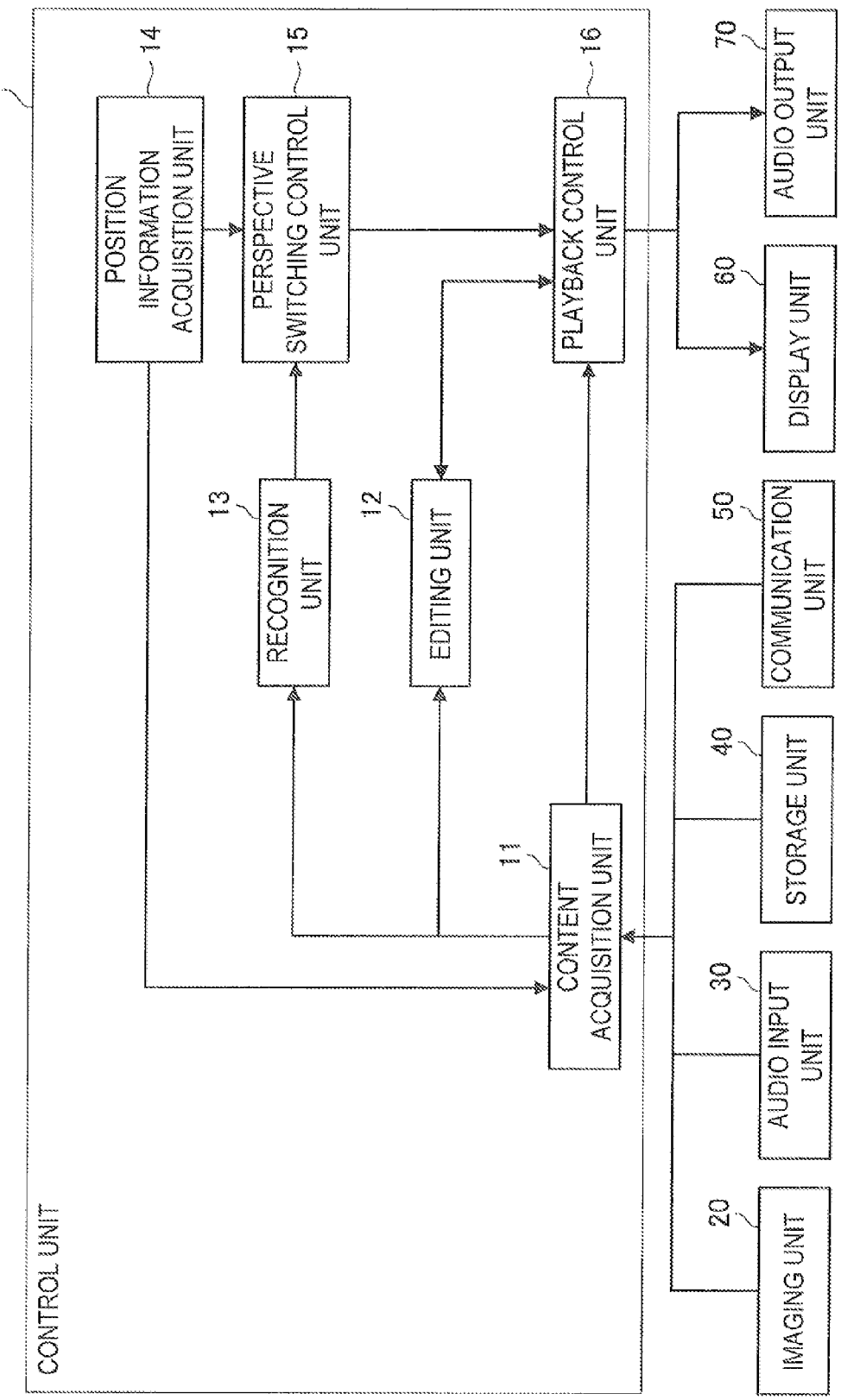
FIG. 4 is a block diagram illustrating an internal configuration of an HMD according to a first embodiment of the present disclosure.

FIG. 4 is a block diagram illustrating an internal configuration of the HMD 1 according to a first embodiment of the present disclosure. As illustrated in FIG. 4, the HMD 1 includes a control unit 10, an imaging unit 20, an audio input unit 30, a storage unit 40, a communication unit 50, a display unit 60, and an audio output unit 70.

(Imaging Unit)

The imaging unit 20 includes, for example, a lens system configured from the imaging lenses 20a, 20b, 20c, 20d, a diaphragm, a zoom lens, and a focus lens, a drive system that makes the lens system perform a focus operation and a zoom operation, and a solid-state image sensor array that generates an imaging signal by photoelectrically converting captured light obtained by the lens system. The solid-state image sensor array may be realized by, for example, a CCD (charge-coupled device) sensor array or a CMOS (complementary metal oxide semiconductor) sensor array.

Further, in the present embodiment, as described above with reference to FIG. 3, the lenses 20a and 20b are arranged so as to capture an image of the user 2 from close range in a state in which the HMD 1 is worn by the user. Therefore, the lenses 20a and 20b can capture close-up images of the user 2 from close range and from various angles. These captured images of the user 2 taken from close range are combined by the below-described editing unit 12 to generate a captured image that looks like it was taken from in front of the user 2.

In addition, in the present embodiment, as described above with reference to FIG. 3, the lenses 20c and 20d are arranged facing forward so as to capture the direction visible to the user 2 as a subject direction in a state in which the user 2 is wearing the HMD 1. Therefore, the lenses 20c and 20d can capture an image of a range that includes the range (field of view) that can be seen by the user 2 through the display unit 60. A gesture made by the user 2 is recognized by the below-described recognition unit 13 based on these captured images that capture the direction visible to the user 2.

The imaging unit 20 outputs the captured images to the control unit 10.

(Audio Input Unit)

The audio input unit 30 includes the microphones 30a and 30b illustrated in FIG. 3, and a micro amplifier unit and an A/D converter that amplify and process the audio signals obtained by the microphones 30a and 30b. The audio input unit 30 outputs the resultant audio data to the control unit 10.

In the present embodiment, the audio input unit 30 collects the voice of the user 2 wearing the HMD 1. The voice of the imaging target included in the content may be replaced by the below-described editing unit 12 with the voice of the user 2 collected by the audio input unit 30.

(Storage Unit)

The storage unit 40 is a unit for performing recording and playback of data in a predetermined storage medium. The storage unit 40 is realized as a HDD (hard disk drive), for example. Obviously, as long as the storage unit 40 can execute recording and playback on the recording medium that is employed, various other kinds of medium may also be used as the recording medium, such as a memory card, an optical disc, a magneto-optical disk, a hologram memory and the like that include a fixed memory.

In the present embodiment, the storage unit 40 stores, for example, moving image content, such as a movie or a video clip and still image content captured by a digital still camera and the like associated with position information. More specifically, the storage unit 40 stores image content, photograph content, text content and the like that is associated with the location where that movie or photograph was taken or the location where that content was set (modeled).

For example, the storage unit 40 associates and stores famous situations and famous scenes from various pieces of image content (movies, television dramas etc.) with position information, a name, an image and the like that specifies the location where that scene was captured. It is noted that position information that specifies a location may be latitude and longitude, for example. Further, a name that specifies a location may be an address, a place name, a facility name, or a building name, for example. In addition, an image that specifies a location may be a captured image of that location, or a captured image of a characteristic building or landscape in the vicinity of that location.

Moreover, a title of the image content that includes that scene, a title screen, a main theme song or the like may also be associated with each scene.

Further, the content may also be associated with information indicating whether that content is based on a first-person perspective or based on a third-person perspective. Moreover, the content may be associated with information indicating whose (which actor) the first-person perspective that content is based on.

(Communication Unit)

The communication unit 50 sends and receives data to and from an external device. The communication unit 50 is an example of a unit for acquiring external information. The communication unit 50 may perform network communication via near field communication with a network access point using wireless LAN (local area network), Bluetooth® or the like, for example. Further, the communication unit 50 may also perform near field communication with an external device that includes a compatible communication function.

This external device may be any device that includes an information processing and a communication function, such as a computer device, a PDA, a mobile telephone terminal, a smartphone, a video device, an audio device, a tuner device and the like. Further examples of the external device to which communication is performed include a terminal apparatus or a server apparatus connected to a network such as the Internet. In addition, the external device may be a two-dimensional bar code, such as a non-contact communication IC card or a QR code (registered trademark) that includes an IC chip, or a hologram memory, from which the communication unit 50 reads information. In addition, another HMD 1 may also serve as the external apparatus.

In the present embodiment, the communication unit 50 receives, for example, moving image content, such as a movie or a video clip, or still image content captured by a digital still camera and the like, and outputs the received content to the control unit 10.

(Audio Output Unit)

The audio output unit 70 includes a pair of the earphone speakers 70a illustrated in FIG. 3 and an amplifier circuit for the earphone speakers 70a. Further, the audio output unit 70 may be formed as a so-called bone-conduction speaker. The audio output unit 70 allows the user to listen to external audio, audio played back by the content stored in the storage unit 40, and audio received by the communication unit 50.

(Control Unit)

The control unit 10 is configured from, for example, a microcomputer that includes a CPU (central processing unit), a ROM (read-only memory), a RAM (random-access memory), a non-volatile memory, and an interface unit. The control unit 10 controls each of the units in the HMD 1.

Further, as illustrated in FIG. 4, the control unit 10 functions as a content acquisition unit 11, an editing unit 12, a recognition unit 13, a position information acquisition unit 14, a perspective switching control unit 15, and a playback control unit 16.

—Content Acquisition Unit

The content acquisition unit 11 acquires as content moving image-based or still image-based image data and audio data output from the imaging unit 20, the audio input unit 30, the storage unit 40, or the communication unit 50.

Especially, the content acquisition unit 11 according to the present embodiment acquires content that is associated with position information indicating the current position of the HMD 1 that is acquired by the position information acquisition unit 14. For example, if an image captured in the past at a position where the HMD 1 is currently present is stored in the storage unit 40, the content acquisition unit 11 acquires a scene from the movie captured at that position as content. In addition, if content specified by a building or a landscape that was captured by the imaging unit 20 (imaging lenses 20c and 20d) and is included in the field of view of the user 2 is stored in an external device, the content acquisition unit 11 can acquire that content via the communication unit 50. For example, the content acquisition unit 11 acquires a scene from a television drama captured on a road as content by making an inquiry to an external device via the communication unit 50 about whether the external device has a television drama that was captured in the past at the road in front of the user 2.

It is noted that the content acquisition unit 11 according to the present embodiment is not limited to acquiring the above-described content that is associated with position information, the content acquisition unit 11 may acquire content specified by the user 2. For example, the content acquisition unit 11 can acquire content about a title input by the user 2, or automatically acquire content in which a song that the user 2 is currently listening to is set as a theme song.

Further, the content acquisition unit 11 acquires and generates in real time a below-described morphing image from the storage unit 40 or an external device connected via the communication unit 50.

The content acquisition unit 11 outputs the acquired content to the editing unit 12, the recognition unit 13, and the playback control unit 16.

—Editing Unit

The editing unit 12 edits a part of the content played back by the playback control unit 16. More specifically, the editing unit 12 performs editing by replacing image data of an imaging target appearing in the played-back content with image data of another imaging target appearing in some other content acquired by the content acquisition unit 11. For example, as described above with reference to FIG. 2, the editing unit 12 can replace image data of the face portion of the actor 4 appearing in the content with image data of the face portion of the user 2 appearing in another captured image.

Here, to perform this replacement of image data, the editing unit 12 may apply the technology disclosed in JP 2010-86178A. This technology captures and registers in advance face images of the user 2's face from different orientations and in various emotions, and replaces an actor's face with a CG (computer graphic) by selecting the face image with the highest correlation to the orientation and expression of the face of the actor appearing in the content from among these registered face images of the user. By applying this technology, the editing unit 12 can replace the face of the actor appearing in the content with the face image having a high correlation among the face images of the user that were registered in advance in the storage unit 40 or an external device.

Further, in addition to using pre-registered face images, the editing unit 12 can use a face image of the user 2 acquired in real time. However, it is difficult for the HMD 1 to acquire a captured image taken from in front of the user 2, for example, while the HMD 1 is being worn by the user 2. Accordingly, the HMD 1 according to the present embodiment acquires in real time a captured image taken from in front of the user 2 based on the following method described with reference to FIG. 5 using the imaging unit 20 (imaging lenses 20a and 20b) arranged so as to capture an image of the user 2 from close range.

Figure 5:
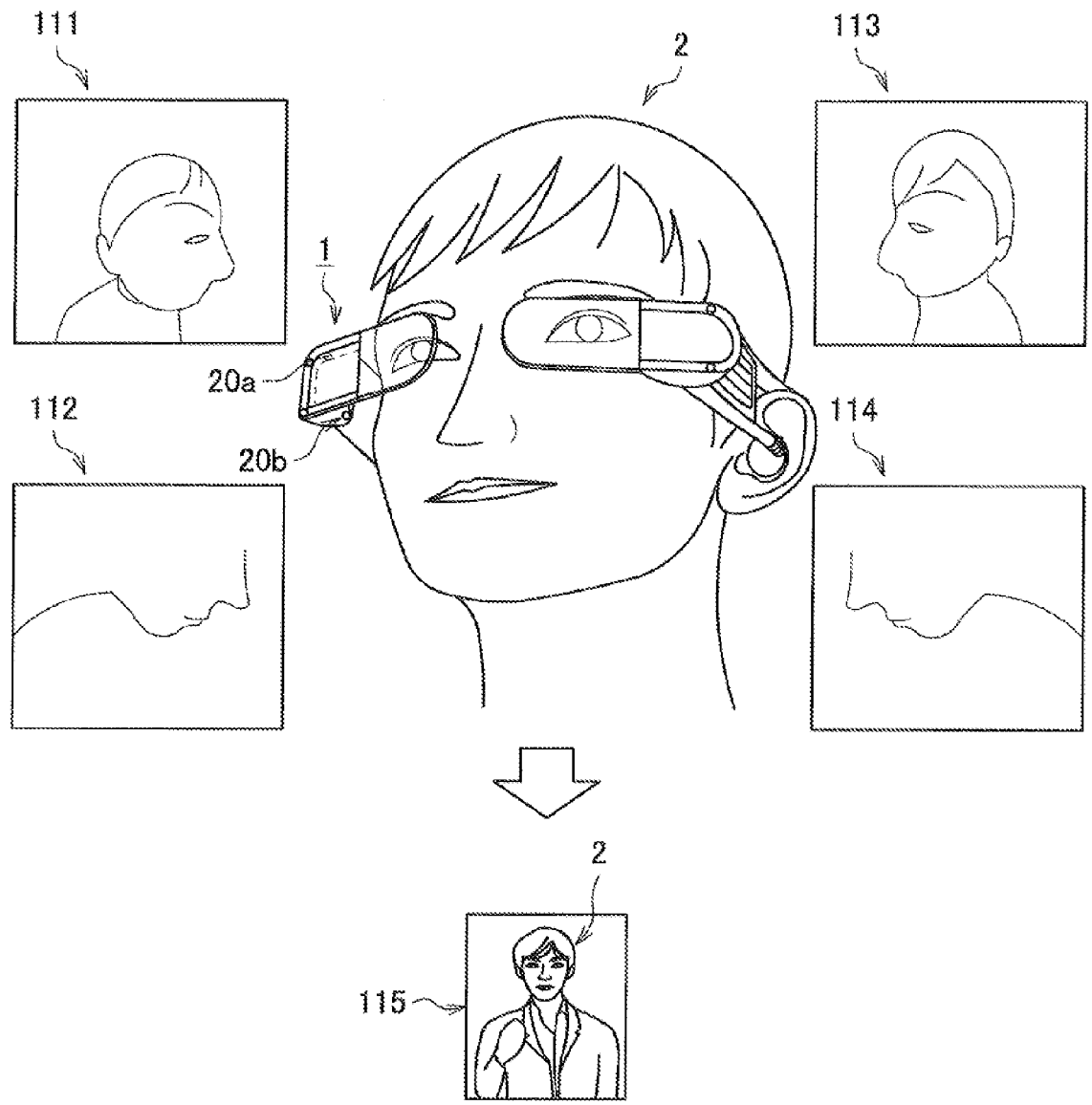
FIG. 5 is a diagram illustrating processing for acquiring a captured image of a user taken from in front by an HMD according to a first embodiment of the present disclosure.

FIG. 5 is a diagram illustrating processing for acquiring a captured image of the user taken from in front by the HMD 1 according to the present embodiment. As illustrated in FIG. 5, a captured image 111 is a captured image of the upper right portion of the user 2's face captured by the imaging lens 20a. A captured image 112 is a captured image of the lower right portion of the user 2's face and the upper right half of the user 2's body captured by the imaging lens 20b. A captured image 113 is a captured image of the upper left portion of the user 2's face captured by an imaging lens (not illustrated) provided on the left side eye. A captured image 114 is a captured image of the lower left portion of the user 2's face and the upper left half of the user 2's body captured by an imaging lens (not illustrated) provided on the right side eye. By combining these captured images 111, 112, 113, and 114, the image processing apparatus according to the present embodiment acquires a captured image 115 in which the upper half, including the face, of the user 2's body appears as if taken from in front. Further, the image processing apparatus according to the present embodiment can replace the face image of a front-facing actor captured in the content with the frontal face image of the user 2 using the captured image acquired by the above-described method.

In addition, the image processing apparatus according to the present embodiment can also similarly generate a captured image of the user 2 that looks as if it was taken from the side or from the rear by arranging the imaging unit 20 so as capture an image of the user 2 from the side of the head or the rear of the head. Therefore, the image processing apparatus according to the present embodiment can replace with the current side-on face profile or the rear profile of the user 2 even when the actor 4 captured in the content is not facing toward the front. This enables the HMD 1 to avoid the need to capture and register in advance face images of the user 2's face from different orientations and in various emotions. Further, the user 2 can enjoy in real time content that reflects his/her current profile.

Still further, a case will now be considered in which the image processing apparatus according to the present embodiment replaced the rear head portion of the actor appearing in the content with the current rear head portion of the user 2. In this case, when switching from a first-person perspective to a third-person perspective, since the user 2 can see his/her own rear head portion while leaving his/her own body, the user 2 can more strongly experience the feeling of having left his/her body. Further, when switching from a first-person perspective to a third-person perspective, the user 2 can more strongly experience the feeling of returning to his/her own body from a state in which he/she had left it, by gradually incorporating his/her own rear head portion.

Moreover, although a case was described above in which the image processing apparatus according to the present embodiment replaces a part of the content with the user 2 who is wearing the HMD 1, the present embodiment is not limited to this example. For example, face images of another person's face from different orientations and in various emotions may be captured and registered in advance, and the editing unit 12 may replace an actor's face with a CG by selecting the face image with the highest correlation to the orientation and expression of the face of the actor appearing in the content from among these registered face images of the other person. In addition, the editing unit 12 may also replace a part of the content with the other person's profile using a captured image of the other person acquired in real time by the imaging unit 20 (imaging lenses 20c and 20d) that is arranged so as to capture the direction visible to the user 2 as the subject direction.

It is noted that when replacing the face image, portions where color is not continuous can occur at a boundary portion between the replaced image and the surrounding images. In this case, the editing unit 12 may apply the technology disclosed in JP 2002-269546A. This is a technology in which the pixel values of the pixels at a portion where the replaced image and a surrounding image overlap are mixed so that the color at the boundary portion changes naturally. By applying this technology, the editing unit 12 can correct the portions where color is not continuous that occur at a boundary portion between the replaced image and the surrounding images.

Further, the editing unit 12 can also replace the audio data of the imaging target appearing in the content with other audio data appearing in other content acquired by the content acquisition unit 11. For example, the editing unit 12 replaces the audio data of the actor 4 appearing in the content with audio data of the user 2 acquired by the audio input unit 30.

The editing unit 12 performs the above-described editing processing on the content output from the playback control unit 16, and outputs the edited content to the playback control unit 16.

—Recognition Unit

The recognition unit 13 recognizes an instruction to switch perspective. For example, the recognition unit 13 recognizes an instruction to switch perspective by recognizing a captured image output from the imaging unit 20 in which a gesture by the user 2 appears, recognizing the voice of the user 2 output from the audio output unit 30, or recognizing a not-illustrated button/switch operation. In the present specification, the recognition unit 13 recognizes an instruction to switch perspectives based on a gesture by the user 2.

The recognition unit 13 can recognize various gestures made using the user 2's body and hands. An example will be described below with reference to FIG. 6 in which a gesture made with the fingers is recognized. FIG. 6 is a diagram illustrating gesture recognition by the recognition unit 13 according to the first embodiment of the present disclosure. It is noted that the recognition unit 13 recognizes a gesture made by fingers when the user 2 waves his/her in front of himself/herself from a captured image output from the imaging unit 20 (imaging lenses 20c and 20d) that captured the front of the user 2.

Figure 6:
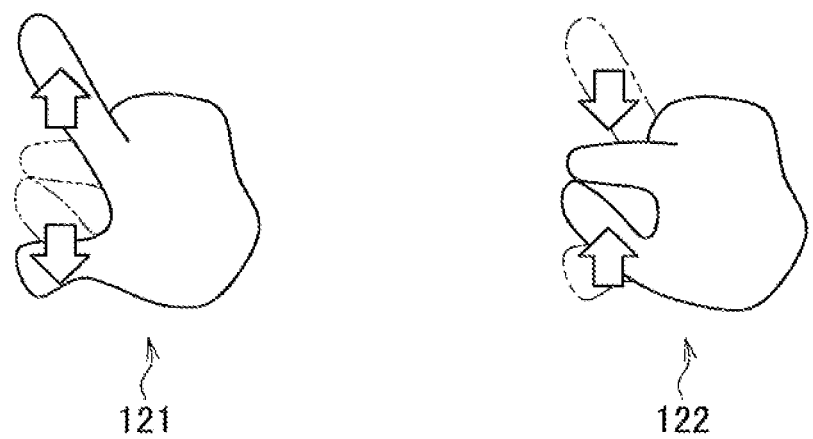
FIG. 6 is a diagram illustrating gesture recognition by a recognition unit according to a first embodiment of the present disclosure.

The gesture 121 illustrated in FIG. 6 illustrates an operation in which two fingers are spread. If the recognition unit 13 recognizes the gesture 121 made with the fingers of the user 2, the recognition unit 13 recognizes that the user 2 is issuing an instruction to switch perspectives from a third-person perspective to a first-person perspective. Here, switching from a third-person perspective to a first-person perspective means that an imaging target that was seen far away is now seen close up. This is similar to an image being enlarged if a similar operation is performed on a touch panel when operating a smartphone or the like. Therefore, the user 2 can issue an instruction to switch perspectives based on a similar familiar operation to that performed when operating a smartphone or the like.

On the other hand, the gesture 122 illustrated in FIG. 6 illustrates an operation in which two fingers are brought closer together. If the recognition unit 13 recognizes the gesture 122 made with the fingers of the user 2, the recognition unit 13 recognizes that the user 2 is issuing an instruction to switch perspectives from a first-person perspective to a third-person perspective. Here, switching from a first-person perspective to a third-person perspective means that an imaging target that was seen up close is now seen far away. This is similar to an image being made smaller if a similar operation is performed on a touch panel when operating a smartphone or the like. Therefore, the user 2 can issue an instruction to switch perspectives based on a similar familiar operation to that performed when operating a smartphone or the like.

Further, the recognition unit 13 can also simultaneously recognize information indicating which actor the user 2 wants to become when recognizing the instruction to switch from a third-person perspective to a first-person perspective. For example, if the user 2 has performed a gesture with his/her fingers so that they are superimposed over an actor appearing in semi-transparently displayed content on the display unit 60, the recognition unit 13 can recognize this gesture as an instruction to switch to the first-person perspective content as seen from that actor.

The recognition unit 13 outputs the recognized switch instruction made by the user 2 to the perspective switching control unit 15.

—Position Information Acquisition Unit

The position information acquisition unit 14 acquires position information about the HMD 1. For example, the position information acquisition unit 14 receives radio waves from a GPS (global positioning system) satellite, and acquires position information including latitude/longitude/altitude indicating the current position of the HMD 1. Further, when the user 2 uses the HMD 1 in a confined space, such as indoors, the position information acquisition unit 14 may acquire the position information based on an indoor positioning technology.

Various indoor positioning technologies may be utilized by the HMD 1. For example, the position of the HMD 1 can be measured based on beacon information from about a plurality of wireless access points arranged indoors. Further, the position information acquisition unit 14 can also measure the position of the HMD 1 based on position information about an IMES (Indoor MEssaging System) transmitter transmitted from an IMES transmitter arranged indoors. Still further, the position information acquisition unit 14 can measure the position of the HMD 1 by, after having acquired a start point position with a given device, calculating the current position in combination with an acceleration sensor or a gyro sensor.

In addition to the latitude/longitude/altitude indicating the current position of the HMD 1, the position information acquisition unit 14 can acquire the bearing and the elevation of the HMD 1. For example, the position information acquisition unit 14 acquires the bearing of the HMD 1 with an electronic compass. Here, the bearing of the HMD 1 indicates the orientation of the user 2's face. Further, the position information acquisition unit 14 acquires the elevation of the HMD 1 with a gyro sensor. Here, the elevation of the HMD 1 indicates the elevation of the user 2's face.

Moreover, the position information acquisition unit 14 may also acquire a relative position with respect to a specific position as the position information about the HMD 1. For example, when using a smartphone 6 indoors, a specific position indoors is pre-set as a position where the imaging target was in the imaging location, and a relative position with respect to that specific position is acquired as the position information.

The position information acquisition unit 14 outputs the acquired position information to the content acquisition unit 11 and the perspective switching control unit 15.

—Perspective Switching Control Unit

The perspective switching control unit 15 switches the perspective when playing back the content acquired by the content acquisition unit 11 with the display unit 60 to at least one of either a first-person perspective or a third-person perspective. The perspective switching control unit 15 switches the perspective based on the switch instruction indicated by the gesture made by the user 2 that was recognized by the recognition unit 13. In addition, the perspective switching control unit 15 may also switch to a perspective from a position corresponding to the position information acquired by the position information acquisition unit 14 in the space of the content. It is noted that an example of the perspective switching control unit 15 switching perspective based on position information will be described in the below second embodiment of the present disclosure.

—Playback Control Unit

The playback control unit 16 plays back the content edited by the editing unit 12 in the perspective switched to by the perspective switching control unit 15. More specifically, the playback control unit 16 controls the display unit 60 and the audio output unit 70 so that the content that was partially edited by the editing unit 12 is played back from at least either a first-person perspective or a third-person perspective. Consequently, if there has been a perspective switch by the perspective switching control unit 15, the playback control unit 16 again acquires the content as seen from the switched-to perspective from the content acquisition unit 11, and plays back the acquired content.

For example, the playback control unit 16 plays back the normal content when playing back content from a third-person perspective, and when playing back content from a first-person perspective, acquires and plays back the movie content from an actor's perspective that has been created in advance. The content from a first-person perspective may be movie content from an actor's perspective created in advance by mounting a camera on the actor's head when capturing the content and having him perform the same acting as the real performance.

In addition, for example, by applying the free-perspective image generation technology disclosed in JP 2006-211531A, the playback control unit 16 can generate in real time content that is based on a perspective from a given position in the space of the content with the content acquisition unit 11. In free-perspective image generation technology, images from a given perspective are generated by merging images obtained from a plurality of cameras based on information about the camera position and imaging angle when capturing the images, and a framing pattern, for example, and performing three-dimensional analysis on the merged image. By applying this technology, the playback control unit 16 can play back content from a given position in a third-person perspective, and play back content from where an actor is in a first-person perspective.

The playback control unit 16 edits the thus-switched content in the editing unit 12, and plays back the edited content with the display unit 60 and the audio output unit 70. The playback control unit 16 also performs the following below-described processing when playing back the content edited by the editing unit 12.

When the perspective is switched by the perspective switching control unit 15, the playback control unit 16 plays back a morphing image that gradually changes from the perspective before the perspective was switched to the switched perspective. Here, "morphing" refers to a special imaging technology based on CG that is generally used in movies and animation, in which the morphing expresses a gradual change from a given form to another form. The morphing image may be pre-stored in the storage unit 40, or may be externally acquired by the communication unit 50, or may be generated in real time by the content acquisition unit 11, for example, during switching.

Here, when switching the perspective, the playback control unit 16 can play back the gradually-changing morphing image so that rather than simply changing, the morphing image is changed using various techniques that are typical in camera-based imaging techniques. For example, the playback control unit 16 can play back the gradually-changing morphing image so that the image it looks as if it was captured using imaging techniques such as zoom in, zoom out, dolly in, dolly back, or panning.

Zoom in is an imaging technique in which the subject is enlarged by increasing the magnification of the imaging lens when capturing an image with a camera. When filming a movie or the like, zoom in is performed for the purpose of, for example, emphasizing a specific subject, guiding the viewer's line of sight, increasing tension and the like. Further, zoom out is an imaging technique in which the subject is made smaller by decreasing the magnification of the imaging lens when capturing an image with a camera. When filming a movie or the like, zoom out is performed for the purpose of, for example, illustrating the surrounding situation or the positional relationship of the subject, reducing tension and the like.

Dolly in is an imaging technique in which the subject is enlarged by bringing the camera closer to the subject when capturing an image with a camera. Further, dolly back is an imaging technique in which the subject is made smaller by moving the camera further away from the subject when capturing an image with a camera. When filming a movie or the like, dolly in/out is performed for the purpose of, for example, giving an impression that the viewer is acting as the main character.

Panning is an imaging technique that follows the subject's movements when capturing an image with a camera. Types of panning include an imaging technique that follows the subject's movements by fixing the camera position and changing only the direction that the camera is pointing, and an imaging technique that follows the subject's movements while moving the camera itself. When filming a movie or the like, panning is performed for the purpose of, for example, illustrating the surrounding situation or the positional relationship of the subject, showing a horizontally wide or a vertically tall imaging target and the like.

When switching the perspective from a third-person perspective to a first-person perspective, the playback control unit 16 plays back a morphing image that changes so that first the perspective zooms in, and then dollies in. The playback control unit 16 can smoothly express the switch from a third-person perspective to a first-person perspective by, first, enlarging the subject in a third-person perspective by zooming in, and then further enlarging the subject in a first-person perspective by dollying in. It is noted that when switching the perspective from a third-person perspective to a first-person perspective, the playback control unit 16 can also play back a morphing image that changes so that first the perspective dollies in, and then zooms in.

Further, when switching the perspective from a first-person perspective to a third-person perspective, the playback control unit 16 plays back a morphing image that changes so that first the perspective dollies back, and then zooms out. The playback control unit 16 can smoothly express the switch from a first-person perspective to a third-person perspective by, first, making the subject in a first-person perspective smaller by dollying back, and then making the subject in a third-person perspective even smaller by zooming out. It is noted that when switching the perspective from a first-person perspective to a third-person perspective, the playback control unit 16 can also play back a morphing image that changes so that first the perspective zooms out, and then dollies back.

In addition, if the camera position where the pre-perspective-switching content was captured and the camera position where the post-switching-perspective content was acquired are different, a morphing image is played back that changes so that the perspective pans. Consequently, the playback control unit 16 can play back content while giving the user 2 an impression as if the images were captured while the camera position is moving.

The above-described example of a morphing image that gradually changes based on imaging techniques such as zoom in, zoom out, dolly in, dolly back, panning and the like will now be described with reference to FIG. 10.

Further, the playback control unit 16 may also change the localized position of the audio image based on the perspective for playing back the content. For example, when playing back the content 101 illustrated in FIG. 1 in a third-person perspective, the playback control unit 16 fixes the voice of the actress 3 and the actor 4 at the far side as seen from the user 2. Further, when playing back the content 104 illustrated in FIG. 1 in a first-person perspective, the playback control unit 16 fixes the voice of the actress 3 right in front of the user 2, and fixes the voice of the actor 4 at the position where the user 2 is himself/herself at. In addition, when the perspective is switched by the perspective switching control unit 15, the playback control unit 16 can play back the content so that the localized position of the audio image gradually changes so as to bridge the difference between these localized positions. For example, when switching from a third-person perspective to a first-person perspective, an audio image that was fixed far away from the user 2 may be gradually changed so as to come closer to the user 2. Consequently, the user 2 can feel a sense of realness due to the switch in perspective.

Further, when the perspective is switched by the perspective switching control unit 15, the playback control unit 16 can play back predetermined audio data as a sound effect. For example, when switching from a first-person perspective to a third-person perspective, the playback control unit 16 can induce α-waves by playing back audio data in which the difference between the frequency of the sound entering the left ear and the frequency of the sound entering the right ear is controlled. Consequently, the user 2 is relaxed by the α-waves, which allows the user 2 to experience the above-described feeling of having left his/her body in a more natural manner. It is noted that this audio data may be any data relating to sound, such as voices, music, ambient sounds and the like.

In the above, the internal configuration of the HMD 1 according to the present embodiment was described.

2-1-3. Operation Processing

Figure 7:
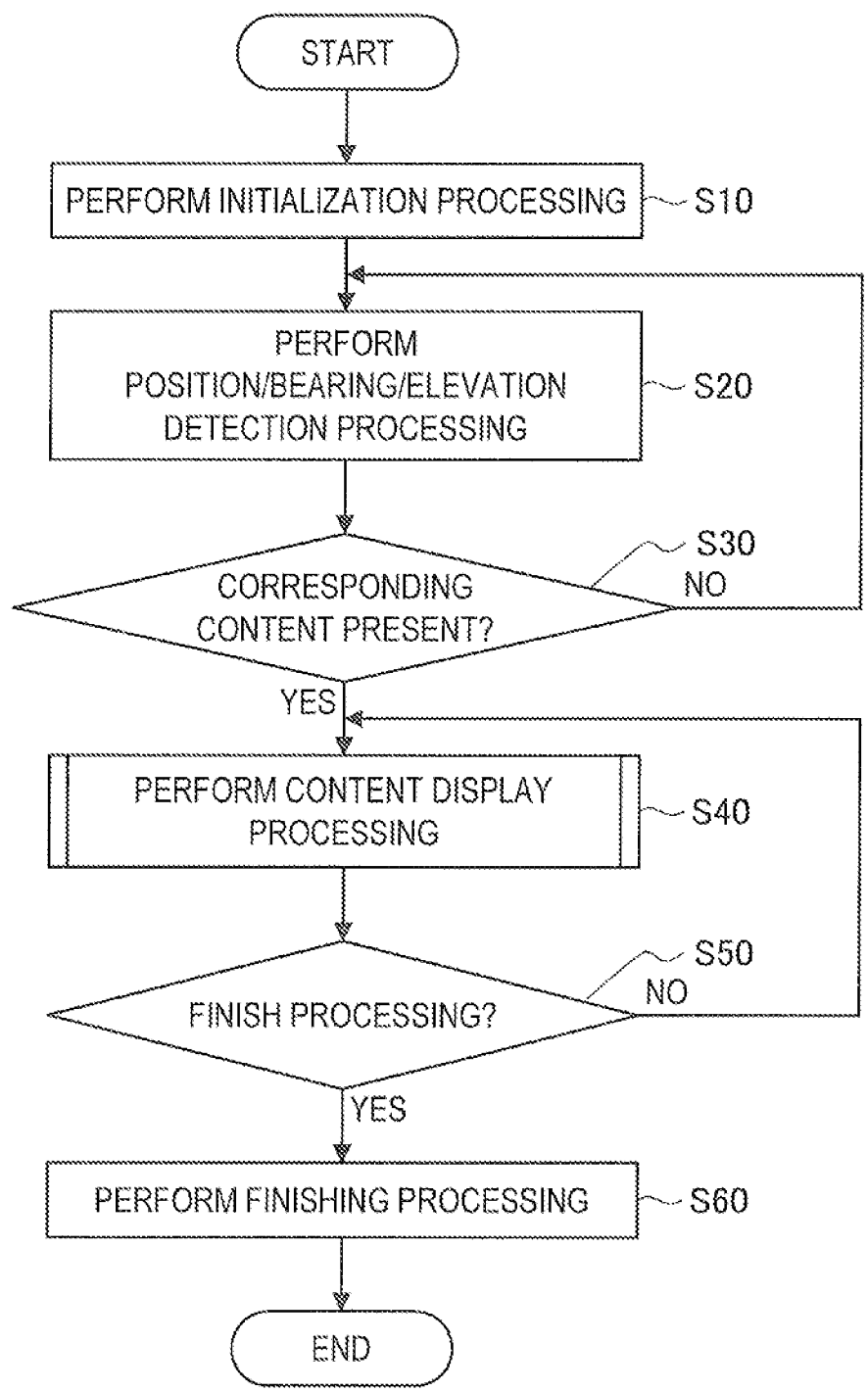
FIG. 7 is a flowchart illustrating operation of a control unit according to a first embodiment of the present disclosure.
Figure 8:
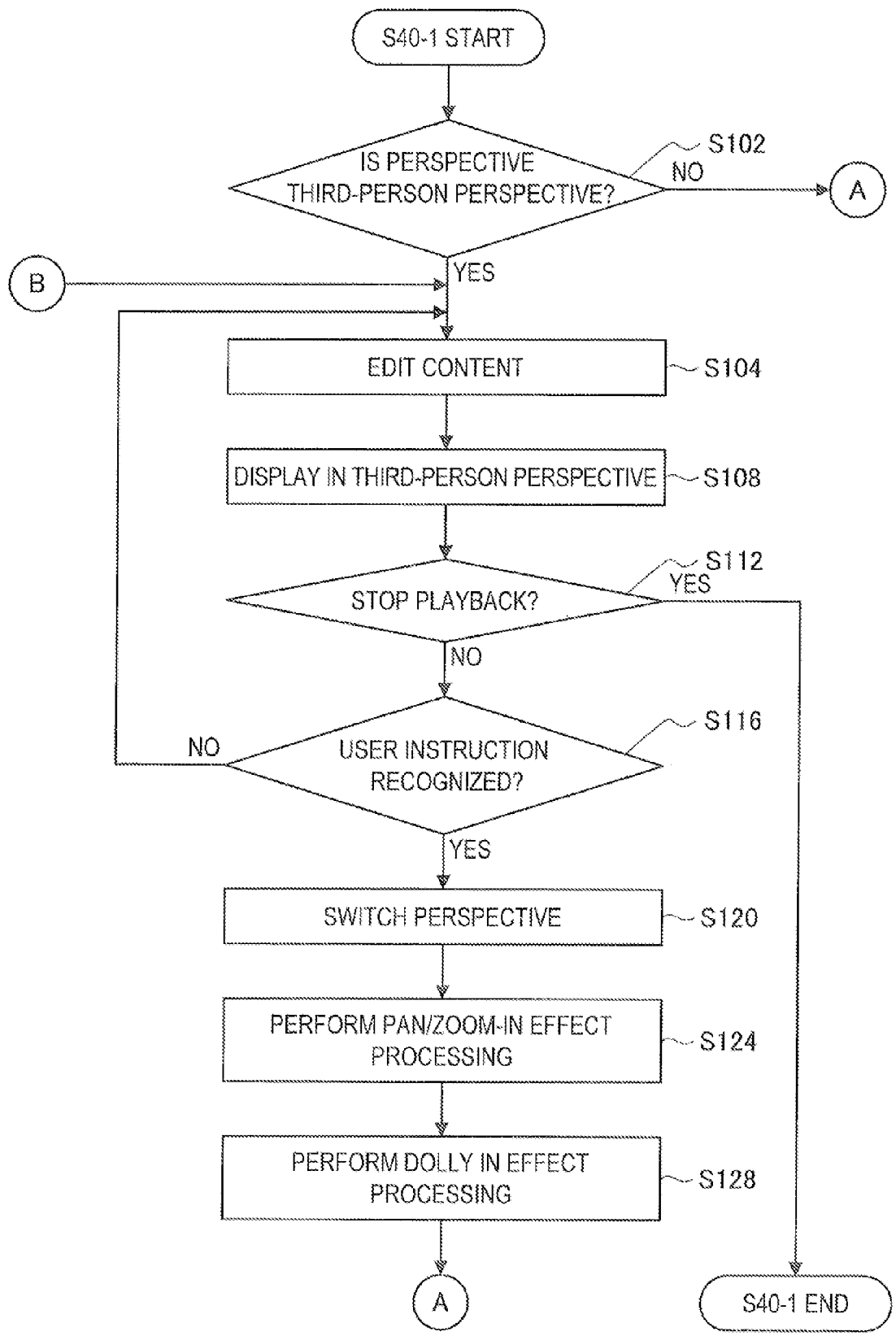
FIG. 8 is a flowchart illustrating operation of a control unit according to a first embodiment of the present disclosure.
Figure 9:
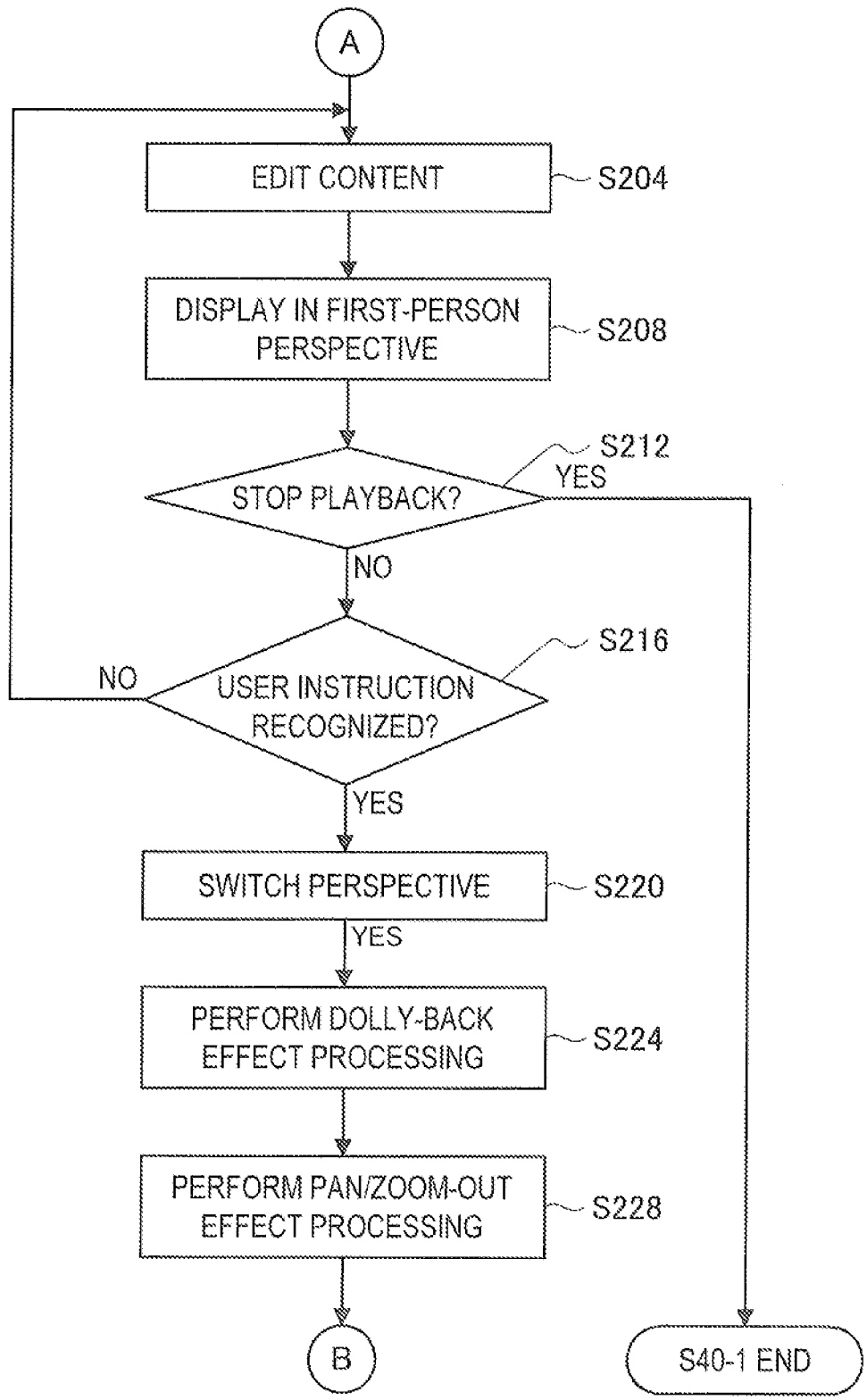
FIG. 9 is a flowchart illustrating operation of a control unit according to a first embodiment of the present disclosure.

Next, the operation processing of the HMD 1 according to the present embodiment will be described with reference to FIGS. 7 to 10. FIGS. 7 to 9 are flowcharts illustrating operation of the control unit 10 according to the first embodiment of the present disclosure. As illustrated in FIG. 7, first, in step S10, the control unit 10 performs initialization processing. More specifically, the control unit 10 performs initialization processing such as reading various setting values from the non-volatile memory and setting initial values.

Next, in step S20, the position information acquisition unit 14 acquires position information, which includes the current position, the bearing, and the elevation of the HMD 1.

Next, in step S30, the content acquisition unit 11 determines whether content corresponding to the position information acquired by the position information acquisition unit 14 is present. For example, the content acquisition unit determines whether the storage unit 40 stores content associated with the acquired position information. Additionally, the content acquisition unit 11 may also make an inquiry to an external device via the communication unit 50 about the presence of content associated with the acquired position information.

If content corresponding to the position information is not present (NO in S30), the processing returns to step S20.

On the other hand, if content corresponding to the position information is present (YES in S30), in step S40, the control unit 10 performs content display processing. It is noted that the content display processing will be described in more detail below.

Next, in step S50, the control unit 10 determines whether to finish the processing. For example, the control unit 10 determines to finish the processing if a finish button has been pressed, if the content has been played back a predetermined number of times in step S30, or if a predetermined duration has elapsed without any operation being made.

If it is determined to not finish the processing (NO in S50), the processing returns to step S40.

On the other hand, if it is determined to finish the processing (YES in S50), in step S60, the control unit 10 performs finishing processing. For example, the control unit 10 performs finishing processing such as writing in the non-volatile memory history information indicating which content was played where and how many times, and the various setting values changed by the user 2 during display.

Next, the above-mentioned content display processing performed in step S40 will be described with reference to FIGS. 8 and 9. As illustrated in FIG. 8, first, in step S102, the perspective switching control unit 15 determines whether the perspective is a third-person perspective. For example, the perspective switching control unit 15 determines whether the perspective is a third-person perspective by referring to information indicating whether the content associated with the content to be played back is content based on a first-person perspective or on a third-person perspective.

If the perspective is not a third-person perspective (NO in S102), the processing proceeds to the below-described step S204.

On the other hand, if the perspective is a third-person perspective (YES in S102), in step S104, the editing unit 12 performs editing processing on the content that was acquired by the content acquisition unit 11 in a third-person perspective. More specifically, the editing unit 12, first, as described with reference to FIG. 5, acquires a captured image that captures the current profile of the user 2. Then, the editing unit 12 replaces the face image of the imaging target, such as an actor or a character appearing in the content, with the face image of the user 2 in the manner described above with reference to FIG. 2.

Further, in step S108, the playback control unit 16 controls so that the content edited by the editing unit 12 is displayed by the display unit 60 and the audio output unit 70. The content that is played back at this time will be described with reference to FIG. 10.

Figure 10:
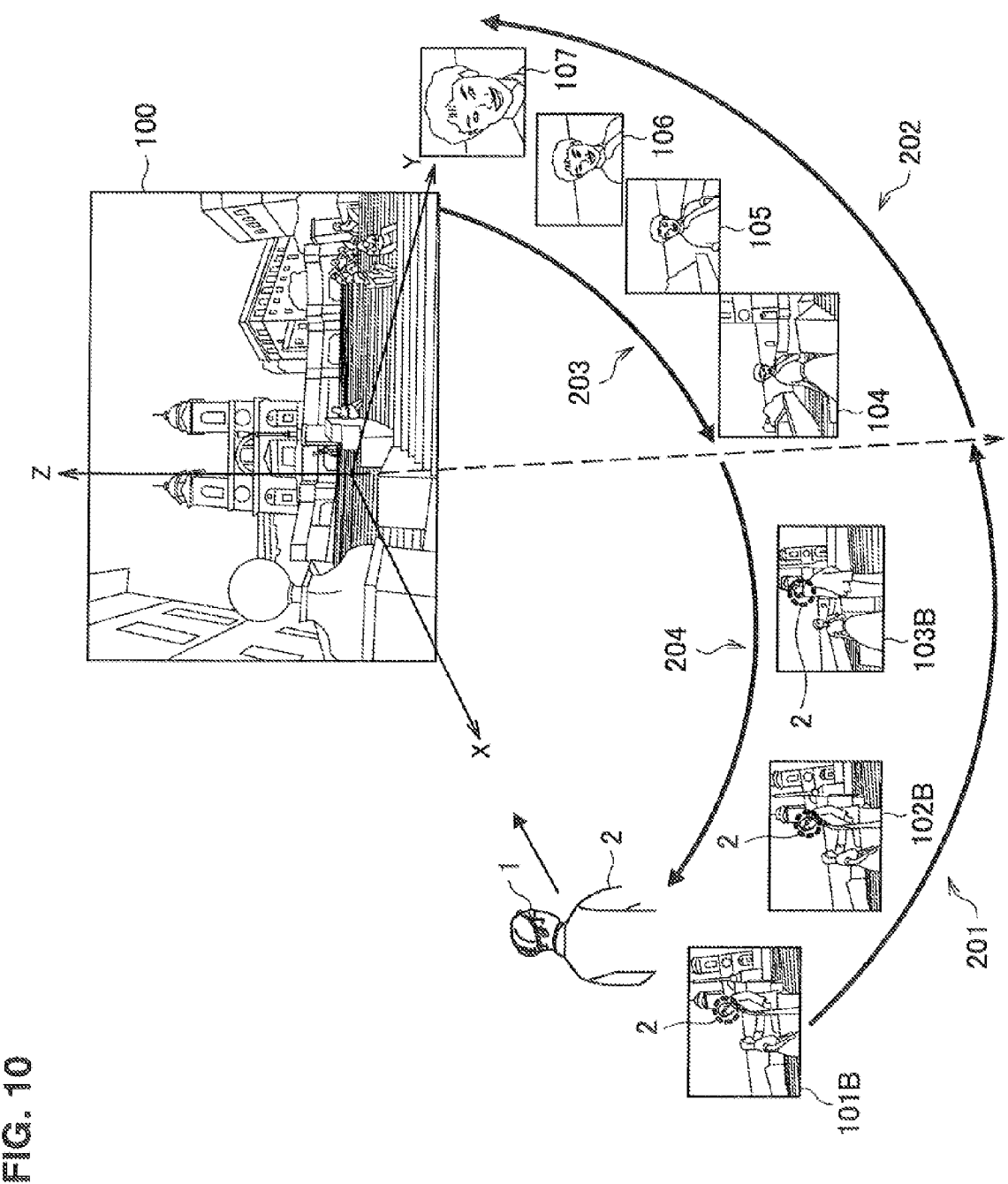
FIG. 10 is a diagram illustrating switching of a perspective by a perspective switching control unit according to a first embodiment of the present disclosure.

FIG. 10 is a diagram illustrating switching of the perspective by the perspective switching control unit 15 according to the first embodiment of the present disclosure. As illustrated in FIG. 10, the playback control unit 16 plays back content 101B based on the third-person perspective set by the perspective switching control unit 15. As illustrated in FIG. 10, the face image of the actor 4 appearing in the content 101B is replaced with the face image of the user 2 by the editing unit 12.

Next, in step S112, the control unit 10 determines whether to stop playback. For example, the control unit 10 determines to stop playback if a playback stop button has been pressed.

If it is determined to stop playback (YES in S112), the content display processing performed by the control unit 10 is finished.

On the other hand, if it is determined not to stop playback (NO in S112), in step S116, the recognition unit 13 determines whether an instruction by the user 2 to switch from a third-person perspective to a first-person perspective has been recognized. For example, the recognition unit 13 determines whether a button/switch operation instructing a switch has been made or whether the gesture described above with reference to FIG. 6 has been recognized.

If an instruction to switch from a third-person perspective to a first-person perspective is not recognized (NO in S116), the processing returns to step S104.

If an instruction to switch from a third-person perspective to a first-person perspective was recognized (YES in S116), in step S120, the perspective switching control unit 15 switches from a third-person perspective to a first-person perspective.

Then, in step S124, the playback control unit 16 performs pan/zoom-in effect processing based on the switch of perspective by the perspective switching control unit 15. In the example illustrated in FIG. 10, as indicated as section 201, the playback control unit 16 successively switches the content to be played back from the content 101B to content 102B and then 103B. At this stage, in order to make up for the difference in perspectives among the respective pieces of content, the playback control unit 16 plays back a morphing image that gradually pans and zooms in. Consequently, the user 2 can experience a feeling of coming closer to the actor 4 while gradually moving around behind the actor 4.

Next, in step S128, the playback control unit 16 performs dolly-in effect processing. In the example illustrated in FIG. 10, as indicated as section 202, the playback control unit 16 successively switches the content to be played back from the content 103B to content 104, 105, 106, and then 107. At this stage, in order to make up for the difference in perspectives among the respective pieces of content, the playback control unit 16 plays back a morphing image that gradually dollies in. Consequently, the user 2 can enjoy the content as if he/she were playing the role of the actor 4 while moving closer step-by-step to the actress 3.

Next, as illustrated in FIG. 9, in step S204, the editing unit 12 performs editing processing on the content acquired by the content acquisition unit 11 in a first-person perspective. For example, although not illustrated in FIG. 10, the editing unit 12 replaces the face image of the actress 3 appearing in the content 107 in a first-person perspective with the face image of another person.

Then, in step S208, the playback control unit 16 controls so that the content edited by the editing unit 12 is displayed by the display unit 60 and the audio output unit 70.

Next, in steps S212 to S216, the control unit 10 operates in the same manner as described above in steps S112 to S116.

If an instruction to switch from a first-person perspective to a third-person perspective was recognized (YES in S216), in step S220, the perspective switching control unit 15 switches from a first-person perspective to a third-person perspective.

Then, in step S224, the playback control unit 16 performs dolly-back effect processing based on the switch of perspective by the perspective switching control unit 15. In the example illustrated in FIG. 10, as indicated as section 203, the playback control unit 16 successively switches the content to be played back from the content 107 to content 106, 105, and then 104. At this stage, in order to make up for the difference in perspectives among the respective pieces of content, the playback control unit 16 plays back a morphing image that gradually dollies back. Consequently, the user 2 can enjoy the content as if he/she were playing the role of the actor 4 while moving step-by-step away from the actress 3.

Next, in step S228, the playback control unit 16 performs pan/zoom-out effect processing. In the example illustrated in FIG. 10, as indicated as section 204, the playback control unit 16 successively switches the content to be played back from the content 104 to content 103B, 102B, and then 101B. At this stage, in order to make up for the difference in perspectives among the respective pieces of content, the playback control unit 16 plays back a morphing image that gradually pans/zooms out. Consequently, the user 2 can experience a feeling of gradually moving away from and around behind the actor 4 to a position overlooking the positional relationship between the actress 3 and the actor 4.

Then, the processing returns to step S104 illustrated in FIG. 8.

In the above, the operation processing of the HMD 1 according to a first embodiment of the present disclosure was described.

2-1-4. First Modified Example of the Present Disclosure

The present modified example is an embodiment in which the editing unit 12 replaces the face image of the imaging target registered in the content with the face image of the user 2, and replaces the voice of that imaging target with the voice of the user 2. The operation processing according to the present modified example will now be described with reference to FIG. 11.

Figure 11:
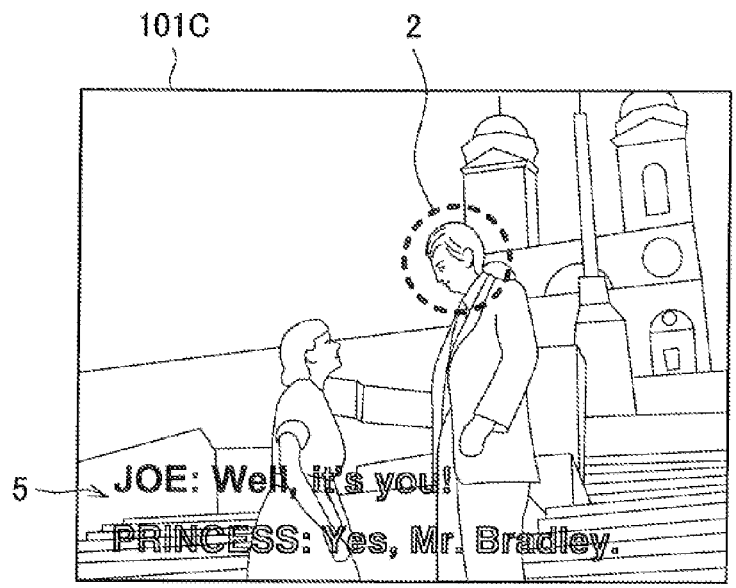
FIG. 11 is a diagram illustrating operation processing of an HMD according to a first modified example of the present disclosure.

FIG. 11 is a diagram illustrating operation processing of the HMD 1 according to the first modified example of the present disclosure. As illustrated in FIG. 11, the playback control unit 16 plays back content in which the face image of the actor 4 has been replaced with the face image of the user 2, and superimposes over that a subtitle which shows the lines spoken by the actress 3 and the actor 4 in that scene. By speaking the lines spoken by the actor 4 in subtitle 5, the user 2 can enjoy the content as if he/she is playing the role of the actor 4. At this stage, the playback control unit 16 temporarily stops the playback of the content on which the subtitle 5 has been displayed, and when it has been recognized by the recognition unit 13 that the user 2 has spoken all of the lines of the actor 4 shown in the subtitle 5, the playback control unit 16 may end the temporary stoppage and play back the next scene.

It is noted that the playback control unit 16 can proceed to the next scene if lip movement is recognized instead of voice recognition. As a result, the user can keep playing back the content by reading the subtitle 5 even in such a noisy environment that voice recognition is difficult to perform. To recognize such lip movement, the playback control unit 16 can use, for example, the technique disclosed in "Lip Movement Reconition Using Template Matching" by Kiyoshi Takita, Takeshi Nagayasu, Hidetsugu Asano, Kenji Terabayashi, and Kazunori Umeda, The Japan Society of Mechanical Engineers, Robotics and Mecatronics Presentation 2011, Collection of Presentation Materials 2P1 to Q12, May 2011. This technique recognizes lip movement based on template matching by using a low-resolution image obtained from an image of the mouth, the shape of the lips, and the shape of the open portion that is formed when the mouth is opened as feature quantities.

Further, the HMD 1 can also be enjoyed by a plurality of users by sharing content edited by the editing unit 12, namely, content in which a part of the content has been replaced with the user 2, over the Internet.

In the above, the first modified example of the present disclosure was described.

2-2. Second Embodiment of the Present Disclosure

The present embodiment is an embodiment in which the perspective when playing back movie content is switched to at least either a first-person perspective or a third-person perspective based on position information. Although the first embodiment according to the present disclosure is realized by the HMD 1 described above with reference to FIG. 4, the present embodiment is realized by a smartphone 6 having the same configuration as the HMD 1. An outline of the present embodiment will now be described with reference to FIG. 12.

2-2-1. Outline

Figure 12:
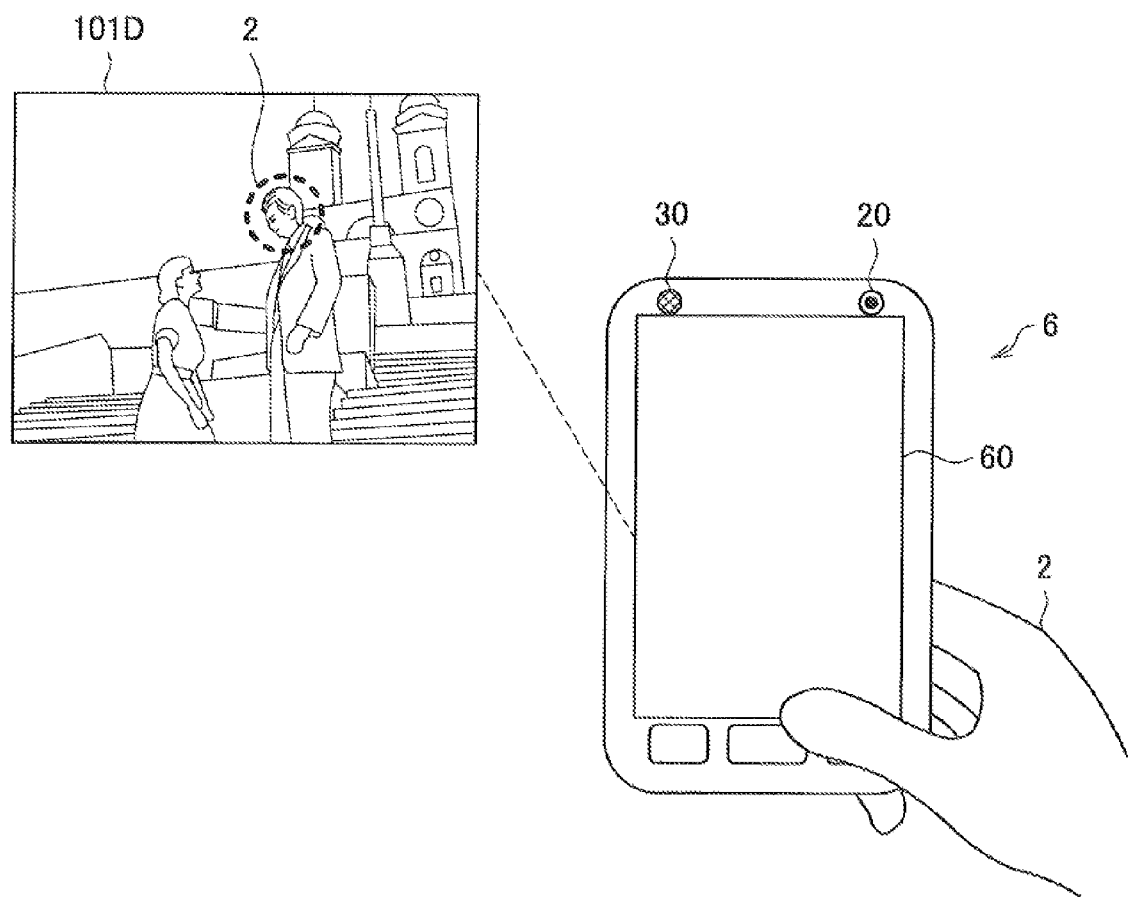
FIG. 12 is a diagram illustrating an outline of a smartphone according to a second embodiment of the present disclosure.

FIG. 12 is a diagram illustrating an outline of the smartphone 6 according to the second embodiment of the present disclosure. The smartphone 6 is gripped by the user 2, and displays content 101B to the user 2. The smartphone 6 includes the imaging unit 20 and the audio input unit 30 on a screen provided in the display unit 60. A part of content 101D is replaced in real time with the face image and voice of the user 2 acquired in real time.

The perspective switching control unit 15 according to the present embodiment switches the perspective for playing back the content based on the position of the smartphone 6. More specifically, the perspective switching control unit 15 switches the perspective when playing back content to the perspective from the position corresponding to the position information acquired by the position information acquisition unit 14 in the space of the content. Here, the position corresponding to the position information acquired by the position information acquisition unit 14 in the space of the content is the position where the smartphone 6 is currently present in the imaging location where that content was captured. The switching of the perspective based on the position of the smartphone 6 that is performed by the perspective switching control unit 15 will now be described.

As described regarding the HMD 1 with reference to FIG. 7, the smartphone 6 acquires and plays back with the content acquisition unit 11 the content corresponding to the position information acquired by the position information acquisition unit 14. At this stage, for example, a change can arise in the position information acquired by the position information acquisition unit 14 due to the smartphone 6 having been moved while still held by the user 2, or the bearing and elevation with which the user 2 is holding the smartphone 6 having changed. In such a case, the content acquisition unit again acquires the content corresponding to the changed position information, and the playback control unit 16 switches the content to be played back to the re-acquired content.

Consequently, when the user 2 moves through a real space while holding the smartphone 6, the perspective of the content to be played back on the display unit 60 switches accordingly. For example, in the example illustrated in FIG. 1, if the user 2 moves to the position of perspective 2-2 in the real world, the perspective switching control unit 15 switches the perspective to perspective 2-2 so that the content 102 is played back. Further, if the user 2 moves to the position of perspective 2-3 in the real world, the perspective switching control unit 15 switches the perspective to perspective 2-3 so that the content 103 is played back.

It is noted that although the position corresponding to the position information acquired by the position information acquisition unit 14 in the space of the content was described as a position in which the smartphone 6 is currently present in the imaging location where that content was captured, the present embodiment is not limited to that example. For example, as the position corresponding to the position information acquired by the position information acquisition unit 14 in the space of the content, a relative position with respect to a specific position may be employed. Below, an example will now be described in which the perspective is switched based on a relative position.

For example, when using the smartphone 6 indoors, a specific indoor position is set as a position corresponding to the location where the imaging target was in the imaging location, namely, a position corresponding to an origin where the X-axis, Y-axis, and Z-axis in the scene 100 illustrated in FIG. 1 intersect. Further, the perspective switching control unit 15 switches the perspective based on a relative change in the position/bearing/elevation of the smartphone 6 with respect to the set specific position. For example, if the smartphone 6 has come closer to that specific position, the perspective switching control unit 15 switches the perspective so as to be closer to the imaging target. Further, if the smartphone 6 has moved further away from that specific position, the perspective switching control unit 15 switches the perspective so as to be further away from the imaging target.

Generally, the location where movies and television dramas are filmed is often far away from where people live, such as overseas or at a tourist site. Therefore, by setting a specific position and changing the perspective when playing back content based on the relative position with respect to that specific position, the user 2 can enjoy content by easily using the smartphone 6 in his/her own room, at school, at a staff lounge at work and the like, without having to go to the filming location.

In the above, an outline of the smartphone 6 according to the second embodiment of the present disclosure was described. Next, the operation processing of the smartphone 6 according to the present embodiment will be described. It is noted that the operation processing of the HMD 1 described above with reference to FIG. 7 is performed in the same manner by the smartphone 6 too. However, the smartphone 6 according to the present embodiment performs the content display processing according to step S40-2 illustrated in FIGS. 13 and 14 as the content display processing performed in step S40 illustrated in FIG. 7. Accordingly, in the below, the content display processing performed in step S40-2, which is a feature of the operation processing performed by the smartphone 6 according to the present embodiment, will be described with reference to FIGS. 13 and 14.

2-2-2. Operation Processing

Figure 13:
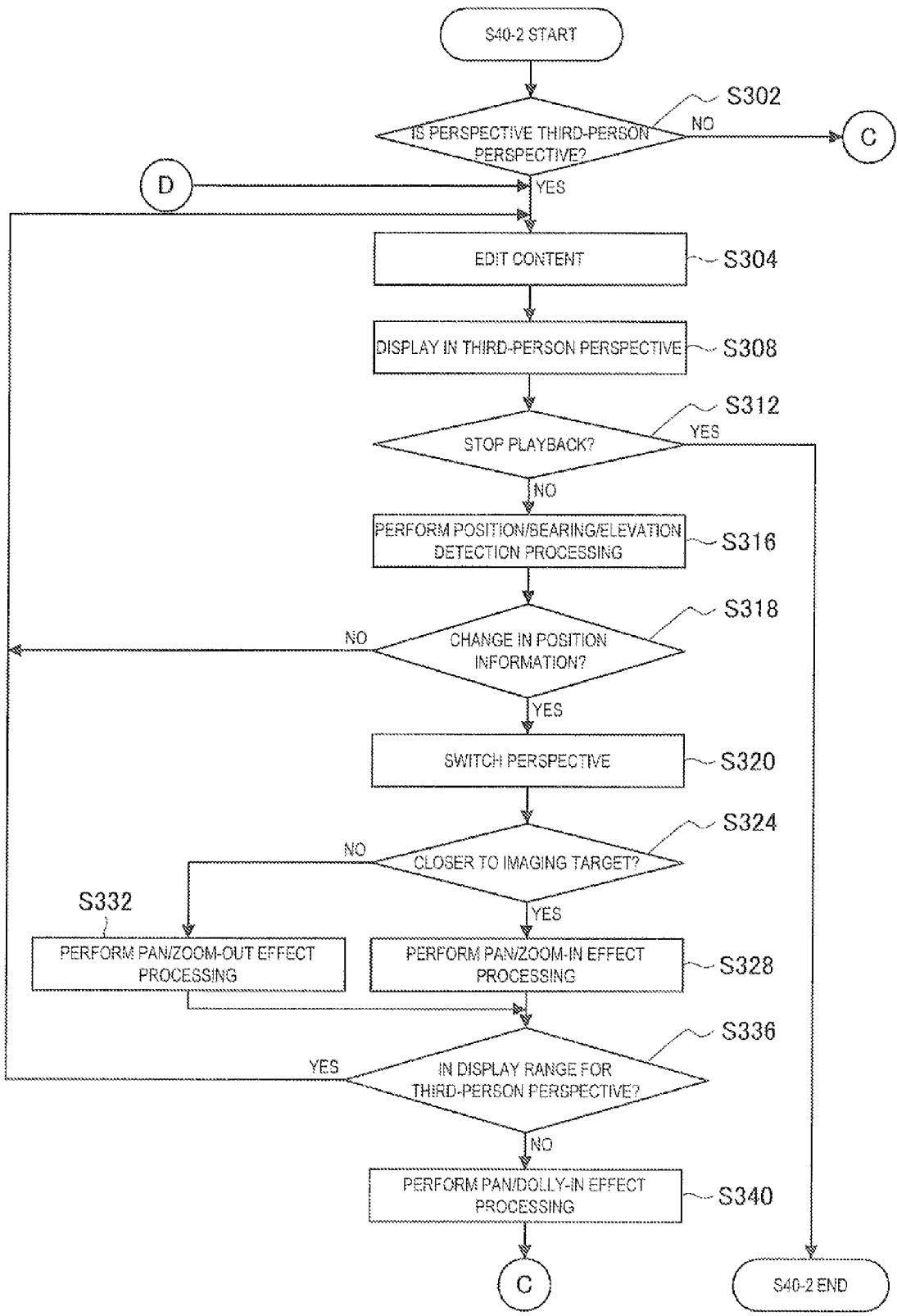
FIG. 13 is a flowchart illustrating operation of a control unit according to a second embodiment of the present disclosure.
Figure 14:
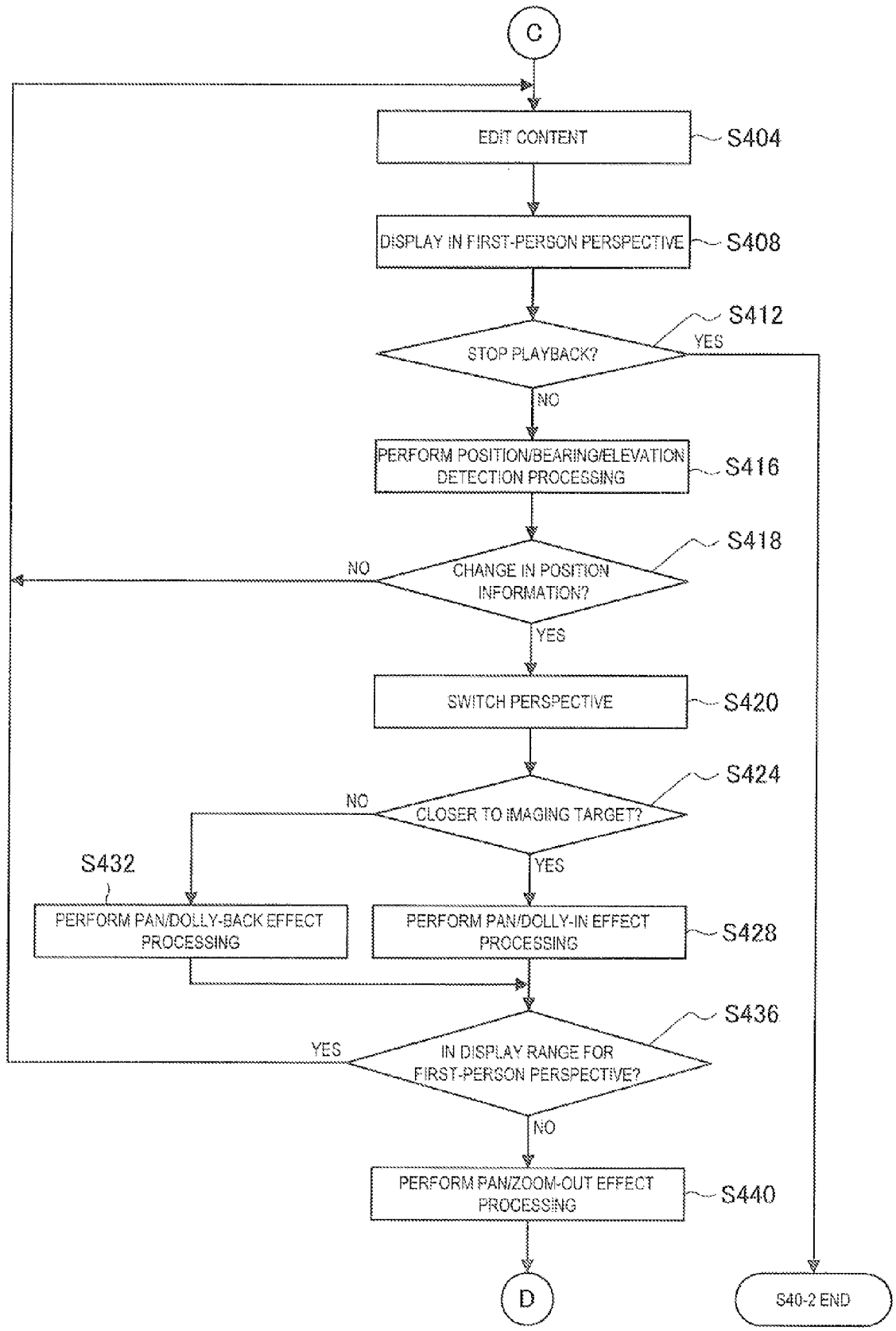
FIG. 14 is a flowchart illustrating operation of a control unit according to a second embodiment of the present disclosure.

FIGS. 13 and 14 are flowcharts illustrating the operation processing performed by the control unit 10 according to the second embodiment of the present disclosure. As illustrated in FIG. 13, first, in step S302, the perspective switching control unit 15 determines whether the perspective is a third-person perspective.

If the perspective is not a third-person perspective (NO in S302), the processing proceeds to the below-described step S404 illustrated in FIG. 14.

On the other hand, if the perspective is a third-person perspective (YES in S302), in steps S304 to S312, the control unit 10 performs the same processing as that in the above-described steps S104 to S112).

Next, in step S316, the position information acquisition unit 14 acquires position information in the same manner as in step S20 illustrated in FIG. 7.

Then, in step S318, the perspective switching control unit 15 determines whether there is a change in the position information acquired by the position information acquisition unit 14. For example, the perspective switching control unit 15 determines that there is a change in the position information if the position information acquired by the position information acquisition unit 14 has changed from the position information acquired the previous time.

If there is no change in the position information (NO in S318), the processing returns to step S304.

On the other hand, if there is a change in the position information (YES in S318), in step S320, the perspective switching control unit 15 switches the perspective to the perspective from the position corresponding to the position information acquired by the position information acquisition unit 14.

Next, in step S324, based on the position information acquired by the position information acquisition unit 14, the perspective switching control unit 15 determines whether the position of the smartphone 6 is closer to the imaging target than the previous time. For example, the perspective switching control unit 15 determines that the position of the smartphone 6 is closer to the imaging target if the user 2 holding the smartphone 6 is closer to the origin illustrated in FIG. 1. Additionally, the perspective switching control unit 15 also determines that the position of the smartphone 6 is closer to the imaging target if the user 2 holding the smartphone 6 is closer to the specific position that was pre-set indoors.

If the position of the smartphone 6 is closer to the imaging target (YES in S324), in step S328, the playback control unit 16 plays back a morphing image that gradually pans and zooms in based on the switch in perspective carried out by the perspective switching control unit 15.

On the other hand, if the position of the smartphone 6 is not closer to the imaging target (NO in S324), in step S332, the playback control unit 16 plays back a morphing image that pans and zooms out based on the switch in perspective carried out by the perspective switching control unit 15.

Next, in step S336, the perspective switching control unit 15 determines whether the position of the smartphone 6 is in range for performing the display in a third-person perspective (is beyond the range corresponding to the imaging target) based on the position information acquired by the position information acquisition unit 14. For example, the perspective switching control unit 15 determines that the position of the smartphone 6 is in range for performing the display in a third-person perspective if the position of the smartphone 6 and the position of the imaging target are further away from each other than a predetermined distance. Additionally, the perspective switching control unit 15 can also determine that the position of the smartphone 6 is in range for performing the display in a third-person perspective if the smartphone 6 is positioned to the side or in front of the imaging target (at a position where the actor is seen from in front or the side).

If the smartphone 6 is in range for performing the display in a third-person perspective (YES in S336), the processing returns to step S304. Thus, if the position of the smartphone 6 is in range for performing the display in a third-person perspective, in the above steps S324, S328, and S332, the playback control unit 16 plays back a morphing image that pans and zooms in/out. Consequently, the playback control unit 16 can play back content in a third-person perspective while giving the user 2 an impression as if the images were captured while the camera position is moving.

On the other hand, if the smartphone 6 is not in range for performing the display in a third-person perspective (NO in S336), in step S340, the playback control unit 16 performs pan/dolly-in effect processing. Although the smartphone 6 plays back the content in the subsequent processing in a first-person perspective, by performing pan/dolly-in effect processing, the playback of the content in a third-person perspective and the subsequent playback of the content in a first-person perspective can be smoothly linked together.

Next, as illustrated in FIG. 14, in steps S304 to S312, the control unit 10 performs processing in the same manner as in the above-described steps S204 to S212.

Then, in steps S416 to S424, the position information acquisition unit 14 performs processing in the same manner as in the above-described steps S316 to S324.

If the position of the smartphone 6 is closer to the imaging target (YES in S424), in step S428, the playback control unit 16 plays back a morphing image that gradually pans and dollies in based on the switch in perspective carried out by the perspective switching control unit 15.

On the other hand, if the position of the smartphone 6 is not closer to the imaging target (NO in S424), in step S432, the playback control unit 16 plays back a morphing image that pans and dollies back based on the switch in perspective carried out by the perspective switching control unit 15.

Next, in step S436, the perspective switching control unit 15 determines whether the position of the smartphone 6 is in range for performing the display in a first-person perspective (is in the range corresponding to the imaging target) based on the position information acquired by the position information acquisition unit 14. For example, the perspective switching control unit 15 determines that the position of the smartphone 6 is in range for performing the display in a first-person perspective if the position of the smartphone 6 and the position of the imaging target are closer to each other than a predetermined distance. Additionally, the perspective switching control unit 15 can also determine that the position of the smartphone 6 is in range for performing the display in a first-person perspective if the smartphone 6 is positioned to the rear of the imaging target (at a position where the actor is seen from behind).

If the smartphone 6 is in range for performing the display in a first-person perspective (YES in S436), the processing returns to step S404. Thus, if the position of the smartphone 6 is in range for performing the display in a first-person perspective, in the above steps S424, S428, and S332, the playback control unit 16 plays back a morphing image that pans and dollies in/out. Consequently, the playback control unit 16 can play back content in a first-person perspective while giving the user 2 the feeling that he/she is freely moving through the content space playing the role of an actor.

On the other hand, if the smartphone 6 is not in range for performing the display in a first-person perspective (NO in S436), in step S440, the playback control unit 16 performs pan/zoom-out effect processing. Although the smartphone 6 plays back the content in the subsequent processing in a third-person perspective, by performing pan/zoom-out effect processing, the playback of the content in a first-person perspective and the subsequent playback of the content in a third-person perspective can be smoothly linked together.

The processing then returns to step S304 illustrated in FIG. 13.

In the above, the operation processing of the smartphone 6 according to the present embodiment was described.

2-2-3. Second Modified Example of the Present Disclosure

The present modified example is an embodiment in which, when a plurality of smartphones 6 are being used simultaneously, a part of the content displayed by each smartphone 6 is replaced with the profile of the owner of another smartphone 6. Below, operation of the smartphone 6 according to the present modified example will be described with reference to FIG. 15.

Figure 15:
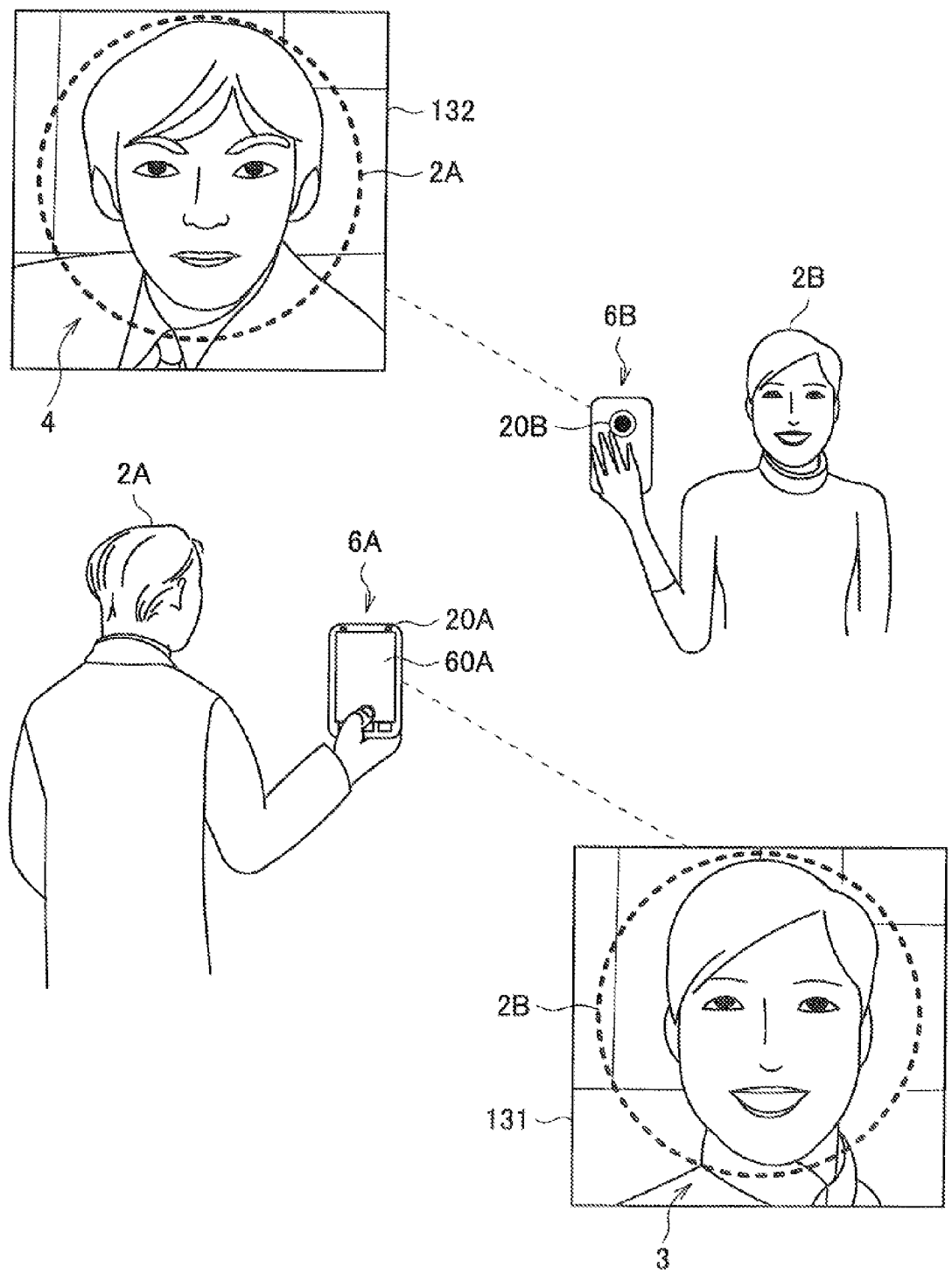
FIG. 15 is a diagram illustrating operation of a smartphone according to a second modified example of the present disclosure.

FIG. 15 is a diagram illustrating operation of the smartphone 6 according to the second modified example of the present disclosure. As illustrated in FIG. 15, a user 2A and a user 2B are facing each other. The user 2A and the user 2B are holding a smartphone 6A and a smartphone 6B, respectively, which are pointed at each other. At this stage, the smartphone 6A held by the user 2A plays back content in which the face image of the actress 3 appearing in content 131 has been replaced with the face image of the user 2B captured by the imaging unit 20 (not illustrated) provided on the rear face of the smartphone 6A. Similarly, the smartphone 6B held by the user 2B plays back content in which the face image of the actor 4 appearing in content 132 has been replaced with the face image of the user 2A captured by the imaging unit 20 (not illustrated) provided on the rear face of the smartphone 6B.

It is noted that the smartphones 6 may exchange with each other the face image of the user 2 who is holding the smartphone 6 that was captured by an imaging unit 20 provided on the same face as the display unit 60. For example, in the example illustrated in FIG. 15, the 6A may send to the smartphone 6B the face image of the user 2A captured by an imaging lens 20A that is provided on the same face as a display unit 60A. This enables content to be played back on the smartphone 6B in which the face image of the actor 4 appearing in content 132 has been replaced with the face image of the user 2A received from the smartphone 6A.

Thus, when a plurality of smartphones 6 are simultaneously used by a plurality of users 2, a part of the content to be played back can be replaced with the profile of another user 2. Consequently, the same content can be enjoyed by a plurality of users 2 together.

3. Conclusion

As described above, the information processing apparatus according to the embodiments of the present disclosure can switch perspective when playing back content to at least either a first-person perspective or a third-person perspective, and play back that content. Further, the information processing apparatus according to an embodiment of the present disclosure can not only switch perspective, it can also edit so that a part of the content is replaced with the user 2. Consequently, the user 2 can enjoy the content as if he/she were actually playing the role of an actor or a character appearing in the content.

Further, the information processing apparatus according to an embodiment of the present disclosure can also switch the perspective in which content is played back based on the position, bearing, or elevation of the information processing apparatus. This allows the user 2 to enjoyably watch the content from a given perspective.

It should be understood by those skilled in the art that various modifications, combinations, sub-combinations and alterations may occur depending on design requirements and other factors insofar as they are within the scope of the appended claims or the equivalents thereof.

For example, in the above-described embodiments of the present disclosure, although the HMD 1 or the smartphone 6 were described as applied examples, the present technology is not limited to those examples. For example, the above-described technology can also be applied in an information processing apparatus that is used for karaoke. Recently, some karaoke establishments offer a service that when the user 2 sings a song, a promotional video or a live concert in which the artist who sings that song appears is played back. By replacing the face image of the artist appearing in the promotional video or live concert with the face image of the user 2 using the above-described technology in an information processing apparatus that provides such a karaoke service, the user 2 can enjoy karaoke as if he/she were that artist. Moreover, in a song that is sung by a plurality of people, such as a duet, by replacing the face images of the plurality of artists, karaoke can be enjoyed by making a plurality of people become those artists.

Further, the hardware such as the CPU, ROM, and RAM in the information processing apparatus can also create a computer program that realizes the same functions as each constituent unit in the above-described HMD 1 or smartphone 6. In addition, according to an embodiment of the present disclosure, a storage medium on which that computer program is recorded is also provided.

Additionally, the present technology may also be configured as below.

(1) An information processing apparatus including:
a perspective switching control unit configured to switch a perspective when playing back content acquired by a content acquisition unit to at least one of a first-person perspective and a third-person perspective;
an editing unit configured to edit a part of the content; and
a playback control unit configured to play back the content edited by the editing unit in the at least one of the first-person perspective and the third-person perspective to which the perspective has been switched by the perspective switching control unit.

(2) The information processing apparatus according to (1), wherein the first-person perspective is a perspective of an object that appears in the content.

(3) The information processing apparatus according to (2), wherein the content includes still image-based or moving image-based image data, and
wherein the object is a living being, a virtual living being, or a character.

(4) The information processing apparatus according to (2) or (3),
wherein the editing unit is configured to replace image data of the object appearing in the content with image data of another object appearing in other content acquired by the content acquisition unit.

(5) The information processing apparatus according to any one of (2) to (4),
wherein the content includes audio data, and
wherein the editing unit is configured to replace audio data of the object appearing in the content with audio data of another object appearing in other content acquired by the content acquisition unit.

(6) The information processing apparatus according to any one of (1) to (5), further including:
a recognition unit configured to recognize a user gesture,
wherein the perspective switching control unit is configured to switch the perspective based on the user gesture recognized by the recognition unit.

(7) The information processing apparatus according to any one of (1) to (6), wherein the playback control unit is configured to, when the perspective is switched by the perspective switching control unit, play back a morphing image that gradually changes from the perspective before the perspective has been switched to the switched perspective.

(8) The information processing apparatus according to (7), wherein the playback control unit is configured to, when the perspective is switched by the perspective switching control unit from the first-person perspective to the third-person perspective, play back the morphing image in a manner that the perspective first dollies back, and then zooms out.

(9) The information processing apparatus according to (7) or (8), wherein the playback control unit is configured to, when the perspective is switched by the perspective switching control unit from a third-person perspective to a first-person perspective, play back the morphing image in a manner that the perspective first zooms in, and then dollies in.

(10) The information processing apparatus according to any one of (7) to (9), further including:
a position information acquisition unit configured to acquire position information about the information processing apparatus,
wherein the perspective includes a perspective from a given position in a space of the content, and
wherein the perspective switching control unit is configured to switch to the perspective to a perspective from a position corresponding to the position information acquired by the position information acquisition unit in the space of the content.

(11) The information processing apparatus according to (10), wherein the playback control unit is configured to, when the perspective is switched by the perspective switching control unit and the perspective is positioned within an area corresponding to an object in the space of the content, play back a morphing image in a manner that the perspective dollies in or dollies back.

(12) The information processing apparatus according to (10) or (11), wherein the playback control unit is configured to, when the perspective is switched by the perspective switching control unit and the perspective is positioned out of an area corresponding to an object in the content space, play back a morphing image in a manner that the perspective zooms in or zooms out.

(13) The information processing apparatus according to any one of (10) to (12), wherein the position information is measured using GPS.

(14) The information processing apparatus according to any one of (10) to (12), wherein the position information is measured based on a relative position with respect to a specific position.

(15) The information processing apparatus according to any one of (1) to (14), wherein the playback control unit is configured to, when the perspective is switched by the perspective switching control unit, play back the content in a manner that a localized position of an audio image gradually changes.

(16) The information processing apparatus according to any one of (1) to (15), wherein the playback control unit is configured to play back predetermined audio data when the perspective is switched by the perspective switching control unit.

(17) A non-transitory computer-readable recording medium having a program recorded thereon, the program causing a computer to execute:
switching a perspective when playing back content acquired by a content acquisition unit to at least one of a first-person perspective and a third-person perspective;
editing a part of the content based on the switching of the perspective; and
playing back the edited content in the at least one of the first-person perspective and the third-person perspective to which the switched perspective has been switched.

What is claimed is:

1. An information processing apparatus comprising:
a perspective switching control unit configured to switch a perspective when playing back content acquired by a content acquisition unit to at least one of a first-person perspective and a third-person perspective;
an editing unit configured to edit a part of the content, wherein the editing unit is further configured to replace image data of an object appearing in a scene of the content with image data of another object appearing in another content acquired by the content acquisition unit; and
a playback control unit configured to play back the content edited by the editing unit in the at least one of the first-person perspective and the third-person perspective to which the perspective has been switched by the perspective switching control unit.

2. The information processing apparatus according to claim 1, wherein the first-person perspective is a perspective of the object that appears in the scene of the content.

3. The information processing apparatus according to claim 1,
wherein the content includes still image-based or moving image-based image data, and
wherein the object is a living being, a virtual living being, or a character.

4. The information processing apparatus according to claim 1,
wherein the content includes audio data, and
wherein the editing unit is configured to replace audio data of the object appearing in the content with audio data of the other object appearing in the other content acquired by the content acquisition unit.

5. The information processing apparatus according to claim 1, further comprising:
a recognition unit configured to recognize a user gesture,
wherein the perspective switching control unit is configured to switch the perspective based on the user gesture recognized by the recognition unit.

6. The information processing apparatus according to claim 1, wherein the playback control unit is configured to, when the perspective is switched by the perspective switching control unit, play back a morphing image that gradually changes from the perspective before the perspective has been switched to the switched perspective.

7. The information processing apparatus according to claim 6, wherein the playback control unit is configured to, when the perspective is switched by the perspective switching control unit from the first-person perspective to the third-person perspective, play back the morphing image in a manner that the perspective first dollies back, and then zooms out.

8. The information processing apparatus according to claim 6, wherein the playback control unit is configured to, when the perspective is switched by the perspective switching control unit from the third-person perspective to the first-person perspective, play back the morphing image in a manner that the perspective first zooms in, and then dollies in.

9. The information processing apparatus according to claim 6, further comprising:
a position information acquisition unit configured to acquire position information about the information processing apparatus,
wherein the perspective includes a perspective from a given position in a space of the content, and
wherein the perspective switching control unit is configured to switch to the perspective to a perspective from a position corresponding to the position information acquired by the position information acquisition unit in the space of the content.

10. The information processing apparatus according to claim 9, wherein the playback control unit is configured to, when the perspective is switched by the perspective switching control unit and the perspective is positioned within an area corresponding to the object in the space of the content, play back the morphing image in a manner that the perspective dollies in or dollies back.

11. The information processing apparatus according to claim 9, wherein the playback control unit is configured to, when the perspective is switched by the perspective switching control unit and the perspective is positioned out of an area corresponding to the object in the content space, play back the morphing image in a manner that the perspective zooms in or zooms out.

12. The information processing apparatus according to claim 9, wherein the position information is measured using GPS.

13. The information processing apparatus according to claim 9, wherein the position information is measured based on a relative position with respect to a specific position.

14. The information processing apparatus according to claim 1, wherein the playback control unit is configured to, when the perspective is switched by the perspective switching control unit, play back the content in a manner that a localized position of an audio image gradually changes.

15. The information processing apparatus according to claim 1, wherein the playback control unit is configured to play back predetermined audio data when the perspective is switched by the perspective switching control unit.

16. A non-transitory computer-readable medium having stored thereon, a set of computer-executable instructions for causing a computer to perform steps comprising:
- switching a perspective when playing back content acquired by a content acquisition unit to at least one of a first-person perspective and a third-person perspective;
- editing a part of the content based on the switching of the perspective,
- wherein the editing includes replacing image data of an object appearing in a scene of the content with image data of another object appearing in another content acquired by the content acquisition unit; and
- playing back the edited content in the at least one of the first-person perspective and the third-person perspective to which the switched perspective has been switched.

* * * * *